(12) United States Patent
Ha et al.

(10) Patent No.: US 11,865,914 B2
(45) Date of Patent: Jan. 9, 2024

(54) METHOD AND APPARATUS FOR DISPLAYING IN A VEHICLE

(71) Applicants: HYUNDAI MOTOR COMPANY, Seoul (KR); KIA MOTORS CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 265 days.

(21) Appl. No.: 17/064,887

(22) Filed: Oct. 7, 2020

(65) Prior Publication Data
US 2021/0107552 A1 Apr. 15, 2021

(30) Foreign Application Priority Data
Oct. 14, 2019 (KR) .......................... 10-2019-0126963

(51) Int. Cl.
*B62D 1/04* (2006.01)
*B60K 35/00* (2006.01)

(52) U.S. Cl.
CPC ...... *B60K 35/00* (2013.01); *B60K 2370/1526* (2019.05); *B60K 2370/1533* (2019.05); *B60K 2370/782* (2019.05)

(58) Field of Classification Search
CPC .. B62D 1/046; B60K 35/00; B60K 2370/175; B60K 2370/1526; B60K 2370/1533; B60K 2370/782; B60K 2370/63
See application file for complete search history.

(56) References Cited

U.S. PATENT DOCUMENTS

| | | | | |
|---|---|---|---|---|
| 11,351,892 B1* | 6/2022 | Roy | ....................... | B60N 2/806 |
| 2012/0074674 A1* | 3/2012 | Ohoka | ................... | B60R 21/203 |
| | | | | 345/1.3 |
| 2015/0142246 A1* | 5/2015 | Cuddihy | ................. | B60R 21/20 |
| | | | | 280/775 |
| 2015/0142247 A1* | 5/2015 | Rao | ......................... | B60R 21/20 |
| | | | | 701/45 |
| 2016/0082912 A1* | 3/2016 | Yoon | .................... | B60R 21/0134 |
| | | | | 701/45 |
| 2016/0200254 A1* | 7/2016 | Raab | ......................... | B60R 1/00 |
| | | | | 348/148 |
| 2016/0280234 A1* | 9/2016 | Reilhac | ................ | G05D 1/0061 |
| 2017/0291493 A1* | 10/2017 | Bostick | .................... | B60Q 9/00 |
| 2018/0056784 A1* | 3/2018 | Virgilio | .................. | B60K 28/02 |
| 2019/0049981 A1* | 2/2019 | Fischer | ................ | G05D 1/0088 |
| 2019/0202341 A1* | 7/2019 | Rikimaru | .............. | G06V 20/588 |

(Continued)

*Primary Examiner* — Christopher E Leiby
(74) *Attorney, Agent, or Firm* — MORGAN, LEWIS & BOCKIUS LLP

(57) ABSTRACT

Disclosed herein is a method of activating a display device in a moving object. The method of activating a display device in a moving object may include determining a driving mode in the moving object, determining whether or not to activate a display device based on the driving mode of the moving object, and displaying an image in the display device, when the display device is activated. Herein, a display device may be activated and an airbag may be deactivated when a driving mode is a first mode. Also, a display device may be deactivated and an airbag may be activated when a driving mode is a second mode.

16 Claims, 23 Drawing Sheets

(56) References Cited

U.S. PATENT DOCUMENTS

| | | | |
|---|---|---|---|
| 2019/0212819 A1* | 7/2019 | Piao | G06F 3/041 |
| 2019/0381937 A1* | 12/2019 | Rakshit | B60R 1/001 |
| 2019/0381962 A1* | 12/2019 | Sheldon | B60R 21/214 |
| 2020/0094852 A1* | 3/2020 | Kahn | B60W 30/18 |
| 2020/0171947 A1* | 6/2020 | Derrick | G06F 1/16 |
| 2020/0172037 A1* | 6/2020 | Klaenhammer | B60R 11/0258 |
| 2020/0215919 A1* | 7/2020 | Laine | G06F 3/04883 |
| 2020/0257288 A1* | 8/2020 | Tsay | B62D 1/046 |
| 2021/0255304 A1* | 8/2021 | Fontijne | G06V 10/803 |
| 2021/0354711 A1* | 11/2021 | Kim | B60N 2/02 |
| 2022/0092891 A1* | 3/2022 | Bengad | B60R 21/015 |

\* cited by examiner

METHOD AND APPARATUS FOR DISPLAYING IN A VEHICLE

CROSS REFERENCE TO RELATED APPLICATION

The present application claims priority to Korean Patent Application No. 10-2019-0126963, filed on Oct. 14, 2019, the entire contents of which are incorporated herein for all purposes by this reference.

TECHNICAL FIELD

The present disclosure relates to a method and apparatus for displaying in a moving object. Particularly, the present disclosure relates to a method and apparatus for implementing a display in the front region of a steering wheel by considering an airbag in a moving object.

BACKGROUND

Along with technical advances, a vehicle can communicate with other devices on the basis of various types of communication methods. In addition, apart from vehicles, diverse apparatuses are being used as apparatuses that can move, communication methods using such apparatuses are developing.

An autonomous car is a human-friendly car that can automatically recognize, judge and control a driving condition by utilizing information collected through installed sensors and a V2X communication apparatus without the driver's intervention. According to the standard proposed by the Society of Automotive Engineers (SAE), autonomous cars are defined by a total of 6 levels, among which Level 3 (conditionally autonomous), Level 4 (highly autonomous) and Level 5 (fully autonomous) correspond to autonomous driving in a real sense.

SUMMARY

The present disclosure may provide a method and apparatus for using the front display device of a steering wheel in a moving object.

The present disclosure may provide a controlling method and apparatus by considering the relationship between a front display device of a steering wheel and an airbag in a moving object.

The present disclosure may provide a method and apparatus for controlling a display device based on an autonomous moving object.

According to an embodiment of the present disclosure, a method of activating a display device may include determining a driving mode of the moving object, determining whether or not to activate the display device based on the driving mode of the moving object, and displaying an image in the display device in determining that the display device is activated. When the driving mode is a first mode, the display device may be activated but an airbag may be deactivated. When the driving mode is a second mode, the display device may be deactivated but the airbag may be activated.

The display device may be the front display device of a steering wheel of the moving object, and the airbag may be an airbag installed in the steering wheel.

The display device may be divided into at least two display devices by a reference line in a direction where the airbag is deployed. When the display device is activated, the at least two display devices may be connected to display an image. When the display device is deactivated, the two display devices may move in opposite directions from the reference line.

The display device is a flexible display. When the display device is activated, the flexible display may be extended to the front region of the steering wheel. When the display device is deactivated, the flexible display may be reduced to the upper region of the steering wheel.

A display protection region exists between the display device and the airbag. The display protection region may absorb an impact on the display device when the airbag is deployed.

In case the airbag is deployed, the display protection region may be deployed in a direction wrapping the display device.

The display device may be fixed to the front display device of the steering wheel of the moving object, and the airbag may be installed at least one of above and below the display device.

When the airbag is installed above the display device and is deployed, the airbag may be deployed in the frontal direction, and the display device may be folded in the lower direction.

When the airbag is installed below the display device and is deployed, the airbag may be deployed in the frontal direction, and the display device may be folded in a different direction from the deployment direction of the airbag.

When the display device is activated based on the first mode, the steering wheel of the moving object may be folded into the moving object, and the display device may be installed in the position where the steering wheel is folded.

The first mode is an autonomous driving mode, and the second mode is a normal driving mode. In the first mode, the control right of the moving object may be provided to the moving object. In the second mode, the control right of the moving object may be provided to a driver of the moving object.

The first mode may be an autonomous driving mode exceeding or the same as a preset level, and the second mode may be at least any one of the normal driving mode or an autonomous driving mode below the preset level.

The method of activating a display device may further include the moving object's driving based on a determined driving mode. When the moving object drives based on the first mode where the display device is activated, the moving object may judge the possibility of collision beforehand.

When the moving object can avoid collision based on the possibility of collision thus judged beforehand, the display device may keep activated.

When the moving object cannot avoid collision based on the possibility of collision thus judged beforehand, the display device may be deactivated and the airbag may be activated.

When the moving object judges the possibility of collision, the moving object may obtain a TTC (Time to Collision) value. When the moving object compares the obtained TTC value and a preset value, the possibility of avoiding collision may be judged.

The possibility of avoiding collision is judged based on an AI (Artificial Intelligence) system. The AI system may periodically update collision avoidance information based on collision-related information.

An image displayed in the activated display device may be the same as an image displayed in a device related to the moving object.

According to another embodiment of the present disclosure, a moving object equipped a display device may include a transceiver transmitting and receiving a signal and a processor controlling the transceiver. The processor determines a driving mode of the moving object and also determines whether or not to activate the display device based on the driving mode of the moving object. When the display device is activated, the processor displays an image in the display device. When the driving mode is a first mode, the display device may be activated but an airbag may be deactivated. When the driving mode is a second mode, the display device may be deactivated but the airbag may be activated.

The display device may be the front display device of the steering wheel of the moving object, and the airbag may be an airbag installed in the steering wheel.

The display device may be divided into two display devices by a reference line in a direction where the airbag is deployed. When the display device is activated, the two display devices may be connected to display an image. When the display device is deactivated, the two display devices may move in opposite directions from the reference line.

The display device is a flexible display. When the display device is activated, the flexible display may be extended to the front region of the steering wheel. When the display device is deactivated, the flexible display may be reduced to the upper region of the steering wheel.

A display protection film exists between the display device and the airbag. The display protection film may absorb an impact on the display device when the airbag is deployed.

In case the airbag is deployed, the display protection film may be deployed in a direction wrapping the display device.

The display device may be fixed to the front display device of the steering wheel of the moving object, and the airbag may be installed at least one of above and below the display device.

When the airbag is installed above the display device and is deployed, the airbag may be deployed in the frontal direction, and the display device may be folded in a different direction from the deployment direction of the airbag.

When the airbag is installed below the display device and is deployed, the airbag may be deployed in the frontal direction, and the display device may be folded in the upper direction.

When the display device is activated based on the first mode, the steering wheel of the moving object may be folded into the moving object, and the display device may be installed in the position where the steering wheel is folded.

The first mode is an autonomous driving mode, and the second mode is a normal driving mode. In the first mode, the control right of the moving object may be provided to the moving object. In the second mode, the control right of the moving object may be provided to a driver of the moving object.

The first mode may be an autonomous driving mode exceeding a preset level, and the second mode may be at least any one of the normal driving mode and an autonomous driving mode equal to or below a preset level.

The processor performs driving based on the determined driving mode. When the moving object drives based on the first mode where the display device is activated, the moving object may judge the possibility of collision beforehand.

When the moving object can avoid collision based on the possibility of collision thus judged beforehand, the display device may keep activated.

When the moving object cannot avoid collision based on the possibility of collision thus judged beforehand, the display device may be deactivated and the airbag may be activated.

When the moving object judges the possibility of collision, the moving object may obtain a TTC (Time to Collision) value. The moving object may judge whether collision can be avoided by comparing the obtained TTC value and a preset value.

The possibility of avoiding collision is judged based on an AI (Artificial Intelligence) system. The AI system may periodically update collision avoidance information based on collision-related information.

An image displayed in the activated display device may be the same as an image displayed in a device related to the moving object.

According to yet another embodiment of the present disclosure, a method of activating a display device may include determining a driving mode in the moving object, determining whether or not to activate the display device based on the driving mode of the moving object, and when the display device is activated, displaying an image in the display device. When the driving mode is a first mode, both the display device and the airbag may be activated. When the driving mode is a second mode, the display device may be deactivated but the airbag may be activated.

The method of activating a display device may further include the moving object's driving based on a determined driving mode. When the moving object drives based on the first mode where the display device is activated, the moving object may judge the possibility of collision beforehand.

According to yet another embodiment of the present disclosure, a moving object equipped a display device may include a transceiver transmitting and receiving a signal and a processor controlling the transceiver. The processor determines a driving mode of the moving object and also determines whether or not to activate the display device based on the driving mode of the moving object. When the display device is activated, the processor displays an image in the display device. When the driving mode is a first mode, both the display device and the airbag may be activated. When the driving mode is a second mode, the display device may be deactivated but the airbag may be activated.

The processor performs driving based on the determined driving mode. When the moving object drives based on the first mode where the display device is activated, the moving object may judge the possibility of collision beforehand.

According to yet another embodiment of the present disclosure, a method of activating a display device may include determining a driving mode in the moving object, determining the display device and an airbag, which are activated based on the driving mode of the moving object, and displaying an image in the activated display device. When the driving mode is a first mode, the steering wheel of the moving object may be folded into the moving object and a first display device may be activated. When the driving mode is a second mode, the steering wheel of the moving object may remain in the interior of the moving object and the first display device may be deactivated.

When the driving mode is a first mode, a first airbag may be deactivated and a second airbag may be activated. When the driving mode is a second mode, the first airbag may be activated and the second airbag may be deactivated.

When the driving mode is a second mode, a second display device may be activated.

The first display device may be located in the cover unit of the folded steering wheel of the moving object, and the first airbag may be located above or below the first display device.

The second display device may be a front display device of the unfolded steering wheel in the moving object.

The first display device is a flexible display. When the first display device is activated, the flexible display may be extended in the cover unit. When the first display device is deactivated, the flexible display may be reduced to the upper region of the cover unit.

A first display protection region exists between the first display device and the first airbag. The first display protection region may absorb an impact on the first display device when the first airbag is deployed.

In case the first airbag is deployed, the first display protection region may be deployed in a direction wrapping the first display device.

When the first airbag is installed above the first display device and is deployed, the first airbag may be deployed in the frontal direction, and the first display device may be folded in the lower direction.

When the first airbag is installed below the first display device and is deployed, the first airbag may be deployed in the frontal direction, and the first display device may be folded in a different direction from the deployment direction of the first airbag.

Wherein the second airbag is an airbag installed in the steering wheel.

The second display device may be divided into at least two display devices by a reference line in a direction where the second airbag is deployed. When the second display device is activated, the at least two display devices may be connected to display an image. When the second display device is deactivated, the two display devices may move in opposite directions from the reference line.

The second display device is a flexible display. When the second display device is activated, the flexible display may be extended to the front region of the steering wheel. When the second display device is deactivated, the flexible display may be reduced to the upper region of the steering wheel.

A second display protection region exists between the second display device and the second airbag. The second display protection region may absorb an impact on the second display device when the second airbag is deployed.

In case the second airbag is deployed, the second display protection region may be deployed in a direction wrapping the second display device.

The second airbag may be installed at least one of above and below the second display device.

When the second airbag is installed above the second display device and is deployed, the second airbag may be deployed in the frontal direction, and the second display device may be folded in the lower direction.

When the second airbag is installed below the second display device and is deployed, the second airbag may be deployed in the frontal direction, and the second display device may be folded in a different direction from the deployment direction of the second airbag.

According to yet another embodiment of the present disclosure, a moving object activating a display device may include a transceiver transmitting and receiving a signal and a processor controlling the transceiver. The processor determines a driving mode of the moving object and also determines the display device and an airbag, which are activated based on the driving mode of the moving object. The processor displays an image in the activated display device.

When the driving mode is a first mode, the steering wheel of the moving object may be folded into the moving object and a first display device may be activated. When the driving mode is a second mode, the steering wheel of the moving object may remain in the interior of the moving object and the first display device may be deactivated.

When the driving mode is a first mode, a first airbag may be deactivated and a second airbag may be activated. When the driving mode is a second mode, the first airbag may be activated and the second airbag may be deactivated.

When the driving mode is a second mode, a second display device may be activated.

The first display device may be located in the cover unit of the folded steering wheel of the moving object, and the first airbag may be located above or below the first display device.

The second display device may be a front display device of the unfolded steering wheel in the moving object.

The first display device is a flexible display. When the first display device is activated, the flexible display may be extended in the cover unit. When the first display device is deactivated, the flexible display may be reduced to the upper region of the cover unit.

A first display protection region exists between the first display device and the first airbag. The first display protection region may absorb an impact on the first display device when the first airbag is deployed.

In case the first airbag is deployed, the first display protection region may be deployed in a direction wrapping the first display device.

A moving object activating a display device, wherein, when the first airbag is installed above the first display device and is deployed, the first airbag is deployed in the frontal direction and the first display device is folded in the lower direction.

When the first airbag is installed below the first display device and is deployed, the first airbag may be deployed in the frontal direction, and the first display device may be folded in a different direction from the deployment direction of the first airbag.

The second airbag may be an airbag installed in the steering wheel.

The second display device may be divided into at least two display devices by a reference line in a direction where the second airbag is deployed. When the second display device is activated, the at least two display devices may be connected to display an image. When the second display device is deactivated, the two display devices may move in opposite directions from the reference line.

The second display device is a flexible display. When the second display device is activated, the flexible display may be extended to the front region of the steering wheel. When the second display device is deactivated, the flexible display may be reduced to the upper region of the steering wheel.

A second display protection region exists between the second display device and the second airbag. The second display protection region may absorb an impact on the second display device when the second airbag is deployed.

In case the second airbag is deployed, the second display protection region may be deployed in a direction wrapping the second display device.

The second airbag may be installed at least one of above and below the second display device.

When the second airbag is installed above the second display device and is deployed, the second airbag may be deployed in the frontal direction, and the second display device may be folded in the lower direction.

When the second airbag is installed below the second display device and is deployed, the second airbag may be deployed in the frontal direction, and the second display device may be folded in a different direction from the deployment direction of the second airbag.

DETAILED DESCRIPTION

Figure 1:
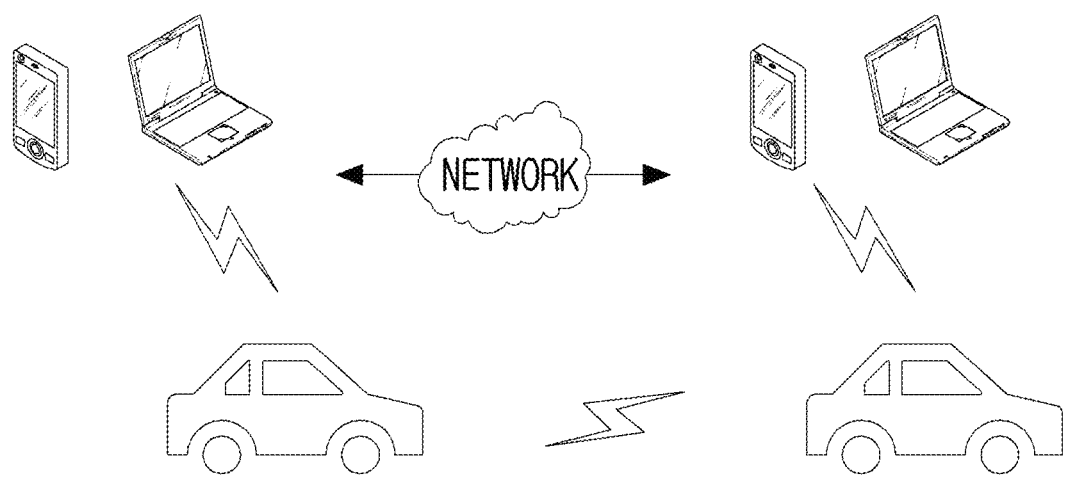
FIG. 1 is a view illustrating a method where a moving object communicates with another moving object or device through a network according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "connected", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other elements in addition to the elements described in the various embodiments are also included in the scope of the present disclosure.

Methods of accomplishing the advantages and features of the present disclosure will be apparent in reference to the embodiments that are described below in detail in conjunction with the accompanying drawings. However, the present disclosure is not limited to the embodiments set forth herein but may be embodied in many different forms. The present embodiments are provided to make disclosed contents of the present disclosure thorough and complete and to completely convey the scope of the disclosure to those with ordinary skill in the art.

FIG. 1 is a view illustrating a method where a moving object communicates with another moving object or device through a network. Referring to FIG. 1, a moving object may communicate with another moving object or another device.

Herein, for example, a moving object may communicate with another moving object or another device based on cellular communication, WAVE communication, DSRC (Dedicated Short Range Communication) and other communication systems. In other words, a cellular network like LTE and 5G, a WiFi network and a WAVE network may be used. In addition, a short-range network like DSRC for moving objects may be used. The above-described embodiments are not exhaustive.

In addition, for example, with regard to communication of a moving object, for the security of a moving object, a communication module dedicated for devices inside the moving object may be separated from a module for communicating with a device outside the moving object. For example, only devices within a certain range inside a moving object may perform communication such as WiFi communication based on security. For example, a communication module may be included for communication between a moving object and the driver's person device. In other words, a moving object and the driver's personal device may use a communication network blocked from an external communication network. In addition, for example, a moving object may include a communication module performing communication with an external device. In addition, for example, the above-described module may be implemented as a single module. In other words, based on a single module, a moving object may communicate with anther device, which is not limited to the above-described embodiment. In other words, communication in a moving object may be embodied in various methods and is not limited to the above-described embodiment.

Herein, for example, a moving object may refer to a device. For example, a moving object may be a vehicle (including an autonomous vehicle or an automated vehicle), a drone, a mobility, a mobile office, a mobile hotel or a PAV (Personal Air Vehicle). In addition, a moving object may be any other mobile device and is not limited to the above-described embodiments.

Figure 2:
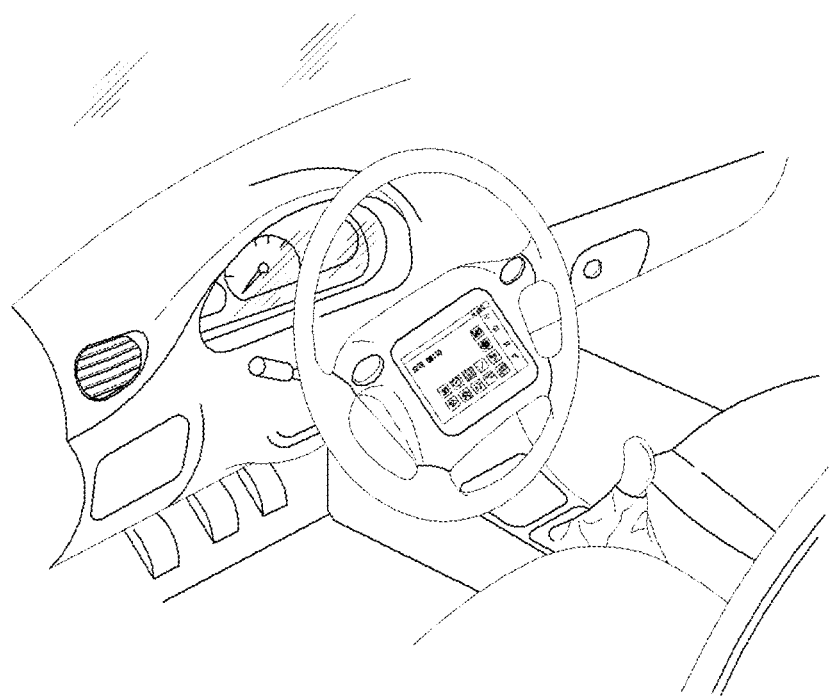
FIG. 2 is a view illustrating a method of installing a display on a steering wheel according to an embodiment of the present disclosure.

FIG. 2 is a view illustrating a method of installing a display device on a steering wheel. Referring to FIG. 2, a display may be installed in the front region of a steering wheel. For example, an airbag may be installed in the front region of a current steering wheel in consideration of a collision accident. However, when autonomous driving is applied to a moving object and thus the possibility of collision is decreased, the corresponding region may be used for displaying.

More specifically, when a moving object travels based on autonomous driving, the user of the moving object may perform a different operation or a necessary work without controlling the steering wheel, unlike the conventional way of driving. In this case, for example, a user may do a work through a smart device or separate apparatuses. However, the user may use the front region of the steering wheel most intuitively as long as the user sits in the driver's seat. Accordingly, in view of UI (User Interface) or UX (User eXperience), a display device may be furnished to the corresponding region and a necessary video or image may be displayed. Thus, the user of a moving object may perform a work or a necessary operation in the corresponding region. Herein, in consideration of an accident of a moving object, an airbag needs to be installed in the corresponding region in order to protect a driver, and a display device needs to be set by reflecting this consideration. For example, when a moving object is operated based on autonomous driving, a collision risk of the moving object may be reduced. For another example, when a moving object is operated based on autonomous driving, the moving object may predict a collision based on autonomous driving and judge whether or not a collision can be avoided. Accordingly, whether or not to activate an airbag installed in the front face of a steering wheel may be controlled based on autonomous driving. In consideration of this, a display device may be furnished to the front face of a steering wheel.

Hereinafter, the autonomous driving mode is defined as an operation mode of a moving object where the moving object is operated while a user does not operate a steering wheel, and the normal driving mode is defined as an operation mode of a moving object where the moving object is controlled by a user operating a steering wheel.

In addition, among embodiments described below, an embodiment applied to an autonomous driving mode may also be applicable to a case where a moving object is parked or stops. When a moving object is parked or stops, it cannot be considered as being in operation. However, as there is no possibility of collision according to the movement of the moving object, the moving object may perform a similar operation to an operation in an autonomous driving mode. In other words, when a moving object is parked or stops and its collision risk is decreased, the moving object may control the activation of an airbag module and a display device, which are installed in a steering wheel. For example, a moving object may judge whether or not to park or stop itself by using a velocity sensor, an acceleration sensor and the like furnished thereto. An airbag module may include an airbag, an inflation module, an impact sensor, and a control circuit, and may be configured to receive information from, for example, a collision sensor of the moving object so as to determine whether to activate the airbag module and whether to deploy and inflate the airbag.

Figure 3:
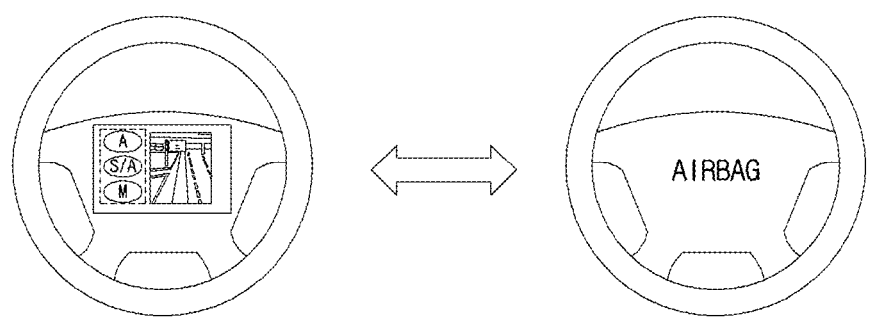
FIG. 3 is a view illustrating a method of converting the activation of a display and an airbag according to an embodiment of the present disclosure.

FIG. 3 is a view illustrating a method of converting the activation of a display device and an airbag module. Referring to FIG. 3, based on the above description, the display device in the front region of a steering wheel may be activated based on autonomous driving. In case the display device is activated, the airbag module may be deactivated. In addition, for example, when the airbag is activated, the display device may be deactivated. Specifically, the conversion for the display device and the airbag module may be performed based on autonomous driving. For example, when an autonomous driving mode is set in a moving object, the moving object may activate the display device and deactivate the airbag module. In addition, for example, as described above, there may be a multiplicity of steps in the autonomous driving mode. For example, in the case of the autonomous driving mode, there may be the autonomous driving mode requiring a user's controlling operation or additional operation. On the other hand, there may be the autonomous driving mode that does not require the user's controlling operation or additional operation. In this case, the conversion for display device activation and airbag module deactivation may be determined based on whether or not the autonomous driving mode is a preset level or above. In other words, the display device may be activated only in an autonomous driving level equal to or above the preset level. Here, for example, the autonomous driving mode where a display device is activated may be differently set according to the moving object or a user. The above-described embodiment is not exhaustive. Meanwhile, for example, when the autonomous driving mode is below the preset level, the display device may be deactivated and the airbag module may be activated. For another example, when the control right of the moving object is switched to a user and thus the autonomous driving mode is turned off, a display device may be deactivated and the airbag module may be activated.

In addition, for example, the airbag module may keep activated irrespective of the activation of the display device. Specifically, when the moving object is operated in the autonomous driving mode, the moving object may activate the display device and deactivate the airbag module. However, for example, even when the moving object is operated in the autonomous driving mode, the moving object may not deactivate the airbag module but keep it activated. In other words, even when the moving object controls the activation of a display device based on the autonomous driving mode, the airbag may keep activated in view of safety issues. In addition, for example, the moving object may activate the first airbag module and deactivate a display device in a normal driving mode. On the other hand, when the moving object is switched to the autonomous driving mode, the moving object may deactivate the first airbag module and activate a second airbag module. In this case, the moving object may activate a display device. In other words, the moving object may deactivate the existing airbag module by considering that a display device is activated and may activate the airbag module considering the display device. The above-described embodiment is not exhaustive.

Figure 4:
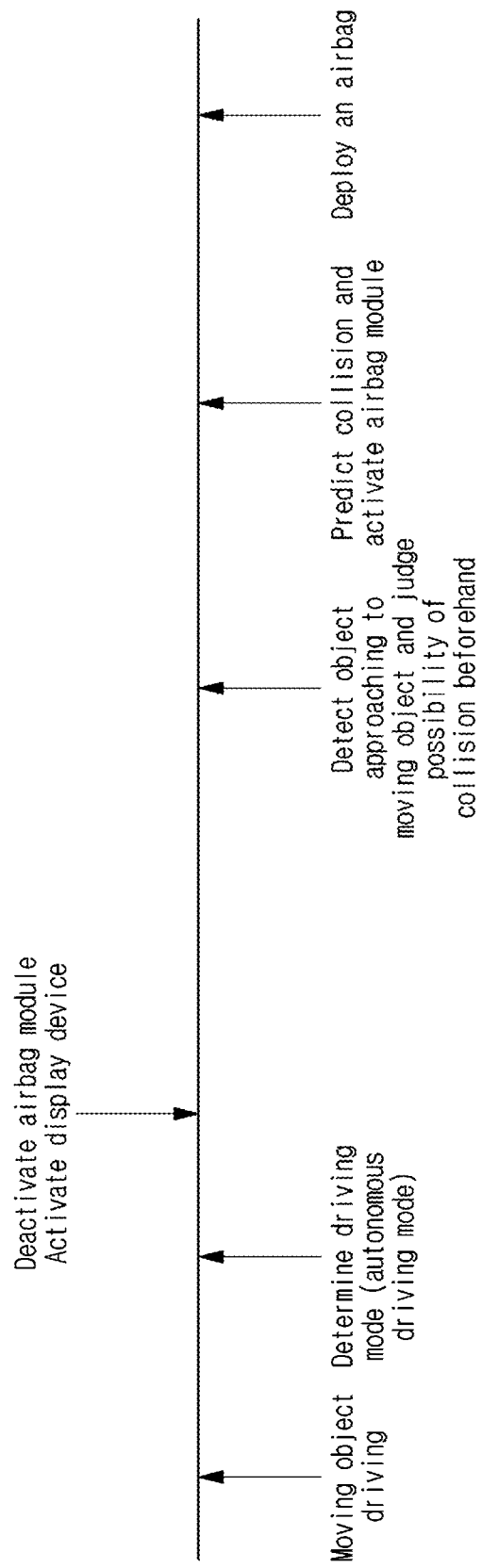
FIG. 4 is a view illustrating a method of inactivating a display device and activating an airbag based on moving object collision detection, according to an embodiment of the present disclosure.
Figure 5:
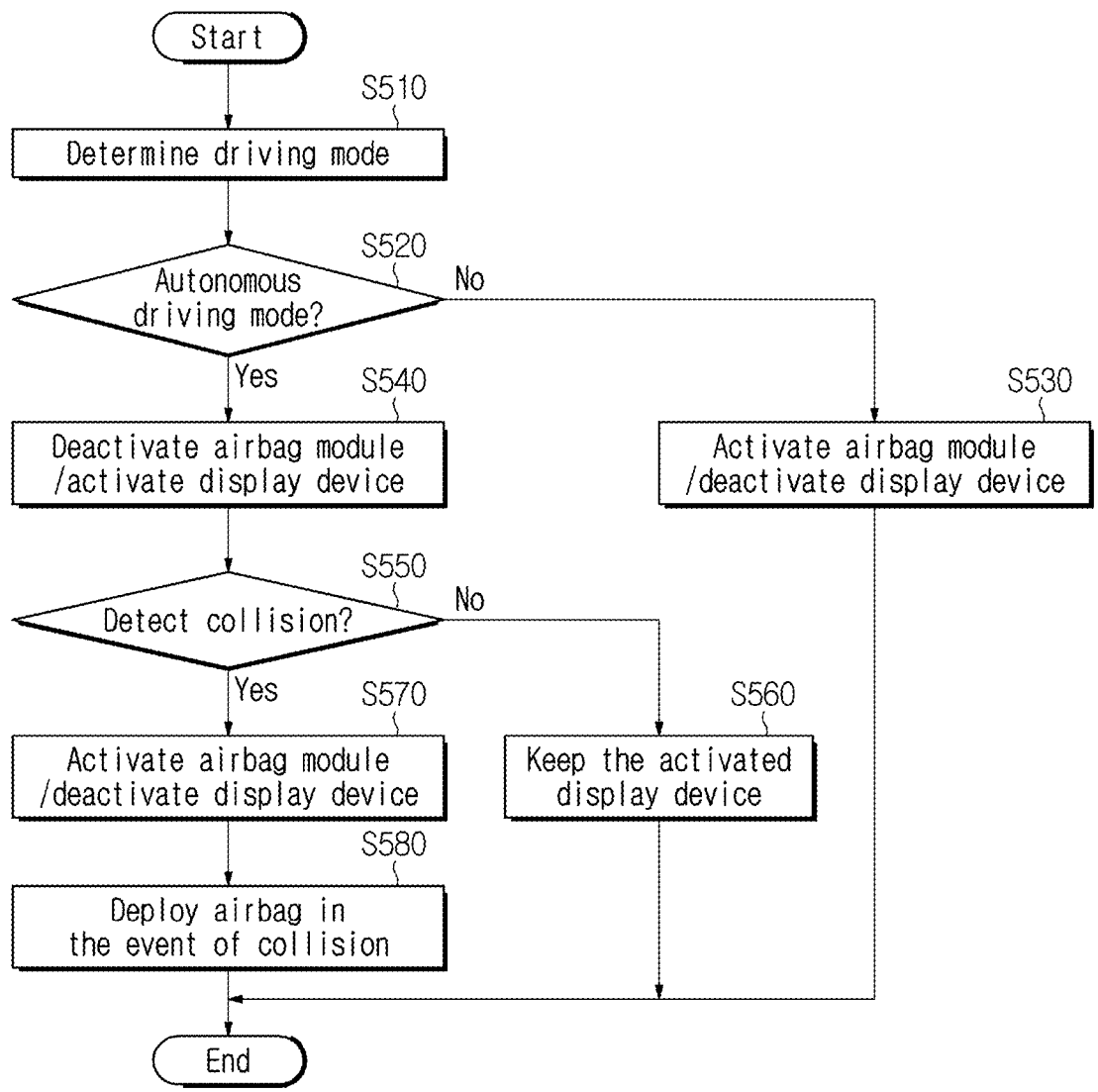
FIG. 5 is a view illustrating a method of inactivating a display device and activating an airbag based on moving object collision detection, according to an embodiment of the present disclosure.

FIG. 4 and FIG. 5 are views illustrating a method of inactivating a display device and activating an airbag module based on moving object collision detection.

Referring to FIG. 4, when a moving object is driven, a driving mode of the moving object may be determined. In this case, for example, as for the driving mode of the moving object, there may be a normal mode where the control right of the moving object is on a user side and an autonomous driving mode where the moving object autonomously drives itself. In addition, for example, the autonomous driving mode may have a preset level (or step), as described above.

Herein, for example, as described above, when the moving object is driven based on the autonomous driving mode, a display device on the front face of a steering wheel may be activated and an airbag module may be deactivated. For another example, when the moving object is driven in one of autonomous driving modes, which is equal to or above the preset level, the display device on the front face of the steering wheel may be activated and the airbag module may be deactivated. In this case, for example, when the moving object activates the display device and deactivate the airbag module based on the autonomous driving mode, the moving object may deactivate the display device and activate the airbag module by considering a collision. Specifically, the moving object may sense an approaching object based on the autonomous driving mode. In addition, based on the autonomous driving mode, the moving object may sense an object with which the moving object is likely to collide in front of, at the back of or alongside it. Here, based on the autonomous driving mode, the moving object may identify whether or not it will collide with the sensed object beforehand. In other words, when the moving object travels based on the autonomous driving mode, the moving object may sense whether or not it will collide with the object beforehand. In this case, if the moving object can avoid a collision, the moving object may maintain the display device and perform a collision avoidance operation. On the other hand, if the moving object judges that the collision cannot be avoided by its operation after sensing whether or not it will collide with the object, the moving object may deactivate the display device and activate the airbag module. Then, when the collision actually occurs, the moving object may deploy the airbag module. On the other hand, if no collision occurs and the moving object judges that it has avoided the object, the moving object may activate the display device again and deactivate the airbag module.

For a concrete example, referring to FIG. 5, when a moving object is driven, a driving mode may be determined (S510). At this time, it may be judged whether or not the driving mode of the moving object is an autonomous driving mode (S520). For example, when the moving object is not operated based on the autonomous driving mode, the moving object may activate the display device and deactivate the display device on a steering wheel (S530). In other words, the moving object may be operated in the same manner as an existing moving object. On the other hand, when the moving object is operated based on the autonomous driving mode, the moving object may deactivate the airbag module and activate the display device on the steering wheel (S540). In addition, for example, when a moving object is operated based on the autonomous driving mode that is equal to or above a preset level, the moving object may deactivate the airbag module and activate the display device, as described above. Then, the moving object may sense a collision based on autonomous driving (S550). Here, for example, when the moving object is operated based on the autonomous driving mode, the moving object may detect a neighboring moving object and other objects nearby based on a driving direction. Then, the moving object may keep driving based on the detected object and moving object. Here, for example, the moving object may sense whether or not it will collide with the detected object or the detected moving object. For example, the moving object may sense whether or not it will collide with the detected object based on at least one or more among the travel direction, velocity and distance of the detected object. In addition, after sensing whether or not it will have a collision with an object, the moving object may judge whether or not the collision with the object can be avoided. For example, the moving object may judge a possibility of collision by using at least one or more among the travel direction and velocity of the moving object and a distance to an object with which the moving object is likely to collide. In other words, the moving object may judge whether a collision can be avoided beforehand based on autonomous driving. In this case, if the moving object can avoid a collision, the moving object may maintain the activation of the display device (S560). For a more concrete example, when the moving object operates based on autonomous driving, the moving object may calculate a TTC (Time To Collision) value. In addition, for example, in view of an AI (Artificial Intelligence) system, a TTC value may be calculated based on a machine learning method. In other words, a time to an actual collision may be calculated through a machine learning method using input information on multiple cases of collisions of moving objects. Thus, based on a time to an actual collision, the above-described TTC value may be calculated. In addition, for example, various methods of calculating a TTC value in the moving object may exist and are not limited to the above-described embodiment.

In this case, for example, the moving object may deactivate the display device and activate an airbag by using a TTC value as a threshold. In other words, when there is a possibility of collision based on a TTC value as a criterion, the moving object may deactivate the display device and activate the airbag module. For example, a threshold of TTC may be 0.5 or 1 second. However, this is only one example, and the above-described embodiment is not exhaustive. For another example the a moving object may also judge a possibility of collision based on other recognized information, which will be described in FIG. 6.

For a more concrete example, a possibility of collision may be determined based on Equation 1 and Equation 2 below. Specifically, a first moving object and a second moving object may be considered as a target moving object for considering a possibility of collision. For example, the first moving object and the second moving object may be moving objects operating in the same direction. For another example, the first moving object and a second moving object may be moving objects operating in different directions. The above-described embodiment is not exhaustive. Herein, for example, a relative velocity and a distance between the first moving object and the second moving object may be calculated to consider a TTC. Here, in Equation 1, X(t) may be a distance between the first moving object and the second moving object at the present time. In addition, $V_r(t)$ may be a relative velocity between the first moving object and the second moving object. In other words, TTC(t) may be determined based on a distance and a relative velocity between moving objects that are likely to collide with each other. Here, for example, TTC may be measured in units of time. In other words, based on a varying distance and a varying relative velocity, a TTC value may be measured in real time. Meanwhile, for example, in Equation 1, a relative velocity may be determined based on the travel directions of a first moving object and a second moving object. For example, a relative velocity may be determined based on a direction where the above-described x(t) decreases. For example, when a first moving object and a second moving object travel in the same direction, $V_r(t)$ may be calculated based on velocity difference according to the travel direction of each moving object, as described in Equation 2 below. In addition, for example, a case where a first moving object and a second moving object have different directions may be considered. In this case, when a first moving object moves in a first direction and a second moving object moves in a second direction, the velocity of each moving object may be determined by considering the direction of an extension of a distance between the first moving object and the second moving object. Here, the velocity of each moving object may be determined by considering a topology of traveling direction and distance for each moving object. In other words, a relative velocity may be obtained based on the equations below, and a TTC value may be determined based on a relative velocity in real time.

$$TTC(t) = \frac{X(t)}{V_r(t)} \qquad \text{Equation 1}$$

$$V_r(t) = V_{1,v} - V_{2,v} \qquad \text{Equation 2}$$

In addition, for example, a possibility of collision may be judged by further considering the above-described TTC value and an emergency braking distance. For example, an emergency braking distance may be expressed by Equation 3 below. For example, an emergency braking distance may be determined based on a delay time and a current velocity V(t) of a moving object. For example, a delay time of a moving object may be determined by various components like a sensor, an ECU and an accelerator. The above-described embodiment is not exhaustive. In other words, an emergency braking distance may be a distance for a moving object to sense a danger and stop itself. Here, for example, a possibility of collision may further consider the above-described TTC and an emergency braking distance. For example, when it is sufficiently possible for a moving object to avoid a collision through emergency braking even if a TTC is short, the moving object can avoid the collision. On the other hand, even if a TTC is long, when an emergency braking distance is long, there may be a possibility of collision. Accordingly, it may be impossible to avoid a collision. In view of the above-described point, a possibility of collision may further consider a TTC value and an emergency braking distance, which is not limited to the above-described embodiment.

$$D(t) = t_{delay} * V(t) \qquad \text{Equation 3}$$

Here, for example, when a moving object can avoid a collision based what is described above, the moving object may maintain a wheel display. In other words, a moving object may maintain a display device and deactivate an airbag in order not to limit a user's operation of a display when there is no risk of collision. On the other hand, when a moving object judges it impossible to avoid a collision, the moving object may activate an airbag and deactivate a wheel display device (S570). In this case, there is a possibility of collision of a moving object, and it may be unclear whether or not an actual collision will occur to the moving object. For another example, when a moving object judges it impossible to avoid a collision, the moving object may activate an airbag and keep a display device activated. For example, when it is impossible for a moving object to avoid a collision, the moving object may activate an airbag and the airbag may be deployed in the event of a collision. Here, for example, if a collision cannot be avoided, it may be an urgent situation. Accordingly, instead of performing an operation for inactivating a wheel display device, a moving object may keep the current activation of the wheel display device and perform an operation for protect the wheel display device from the deployment of an airbag. In other words, while maintaining the activation of a wheel display device, a moving object may perform an operation for protecting the display device, thereby preventing the display device from hindering the deployment of an airbag. The above-described embodiment is not exhaustive. Here, for example, when a collision actually occurs to a moving object, the moving object may deploy an activated airbag based on the collision (S580). In other words, since a collision can be predicted in the case of autonomous driving, the user's convenience may be enhanced by controlling the activation of a wheel display device and the activation of an airbag.

Figure 6:
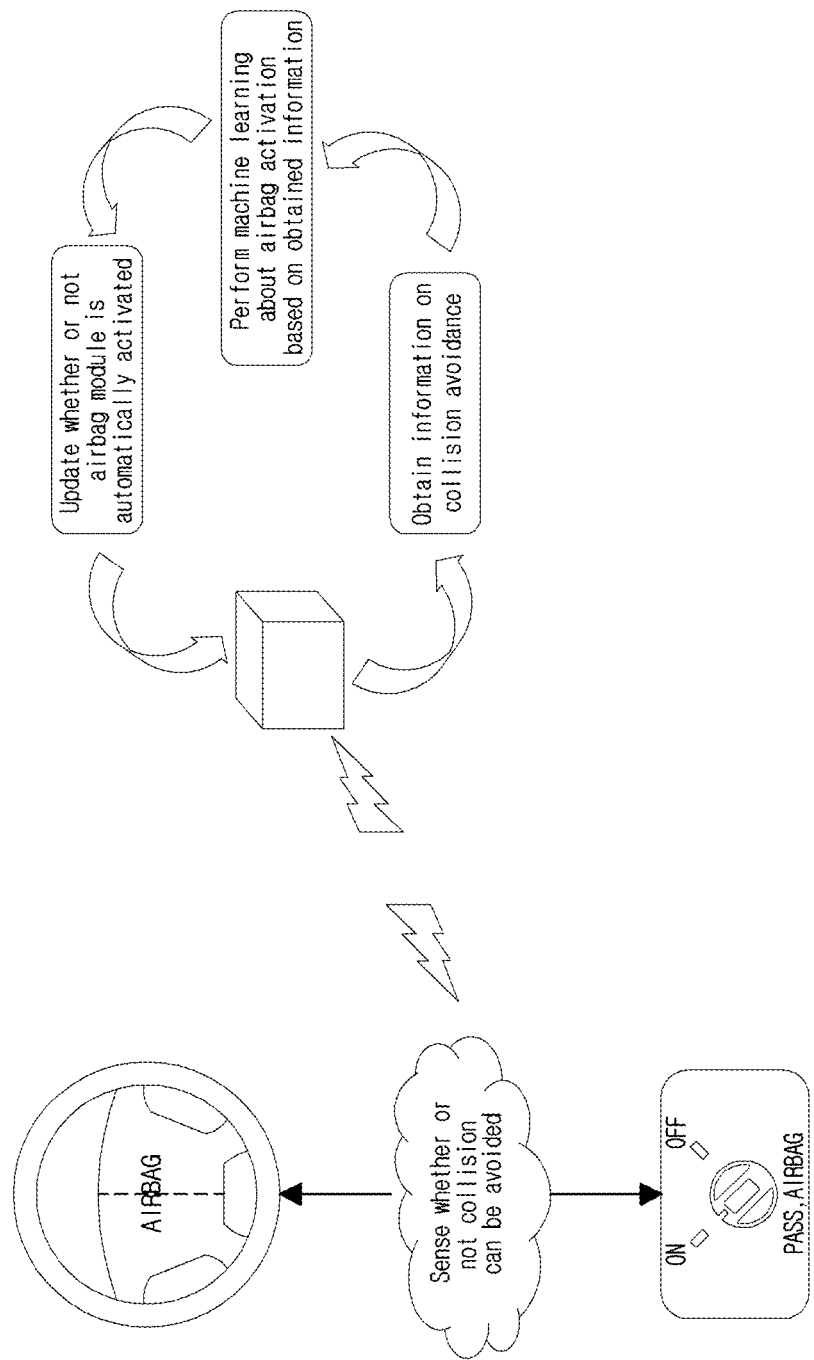
FIG. 6 is a view illustrating a method of updating whether or not an airbag is activated according to an embodiment of the present disclosure.

FIG. 6 is a view illustrating a method of updating whether or not an airbag is activated. Referring to FIG. 6, as described above, a wheel display device may be activated, and an airbag may be deactivated. Here, for example, based on autonomous driving, a moving object may judge a possibility of collision and deactivate a wheel display device. However, for example, a moving object may frequently judge a possibility of collision and whether or not to avoid collision on the basis of autonomous driving. For example, when a moving object is close to another moving object or an object in such a case as it stops on a road or slows down according to road conditions, the moving object may have many judgment operations for a case where there is a possibility of collision, even if the possibility is judged according to autonomous driving. Here, for example, if a moving object deactivates a wheel display device and activates an airbag at every operation related to a possibility of collision, as described above, the efficiency of controlling the operation of the moving object may be decreased, and the user's convenience for the moving object may be reduced. In view of what is described above, a moving object may continually update information on a possibility of collision and whether or not a collision can be avoided. For example, a moving object may update information on a possibility of collision and whether or not a collision can be avoided through an AI (Artificial Intelligence) system. Herein, an AI system may be implemented in a moving object itself. For another example, a moving object may transmit information on a possibility of collision and whether or not a collision can be avoided to a server, and receive information processed by the server and update it.

For a more concrete example, a moving object may update the corresponding information whenever performing the above-described operation of FIG. 6. In other words, when a moving object judges a possibility of collision and whether or not a collision can be avoided, the operation of the moving object may become input information. In this case, the information and result for the above-described judgment may be continually stored and updated. For example, as described above, an AI system may obtain information on a possibility of collision and whether or not a collision can be avoided and may perform updating for it. For a concrete example, an AI system may collect information on identical or similar situations and learn them by comparing results. In other words, based on information already obtained and stored, an AI system may perform learning on an actual possibility of collision and whether a collision can be avoided and may continually perform updating for the information. For example, when an AI system obtains more samples and recognizes various situations, the accuracy of judgment concerning whether or not a collision can be avoided may increase, as described above. Based on what is described above, an AI system may update information on a possibility of collision and whether or not a collision can be avoided and may provide the information to a moving object. Here, since information on a possibility of collision and whether or not a collision can be avoided is continuously updated, a moving object may enhance the accuracy for a situation of collision. Based on the above description, a moving object may enhance an accuracy of judgment concerning the activation of a display device and the inactivation of an airbag. Thus, a moving object may improve the user's convenience for a wheel display device, which is not limited to the above-described embodiment.

Meanwhile, for example, when an AI system performs learning for a possibility of collision, the AI system may judge a possibility of collision based on a TTC value, as described above. In other words, after obtaining information on various cases as input information, an AI system may calculate a time to an actual collision on the basis of the input information. Thus, an AI system may calculate a TTC value, thereby judging a possibility of collision. In other words, the reference information for judging a possibility of collision may be a TTC value, which is not limited to the above-described embodiment.

Figure 7:
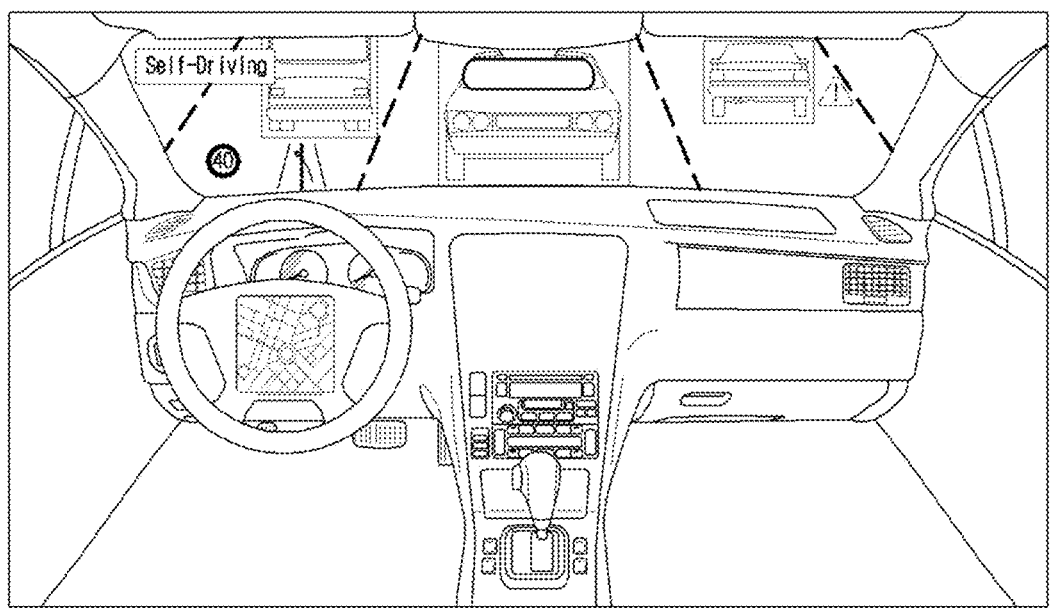
FIG. 7 is a view illustrating a method of using a display device according to an embodiment of the present disclosure.

FIG. 7 to FIG. 11 are views illustrating a method of using a display device. Referring to FIG. 7, as described above, when a wheel display device is activated, a moving object may display various information in the wheel display device. For example, a moving object may display information on navigation and a path in a wheel display device. In addition, for example, a moving object may display information related to controlling the moving object in a wheel display device. Here, for example, a wheel display device may be a limited display device. Accordingly, displaying may be limited only to information related to a moving object. The above-described embodiment is not exhaustive.

Figure 8:
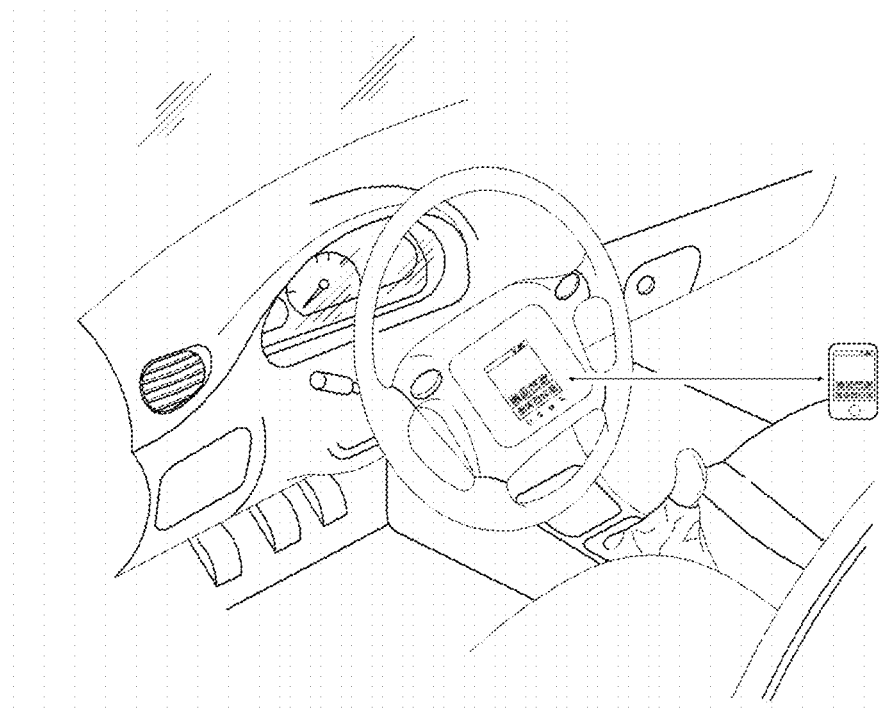
FIG. 8 is a view illustrating a method of using a display device according to an embodiment of the present disclosure.

For another example, referring to FIG. 8, the safety of a moving object may be secured based on autonomous driving. Accordingly, a wheel display device may be used in conjunction with a smart device. Specifically, as described above, when a moving object operates in an autonomous driving mode and a possibility of collision can be judged, the moving object may display various information by using a wheel display device. For example, a user of a moving object may display information displayed on the user's smart device on a wheel display in a mirroring or extended form. Thus, when a moving object travels based on an autonomous driving mode, a user may perform a necessary operation through the moving object without using a smart device.

Figure 9:
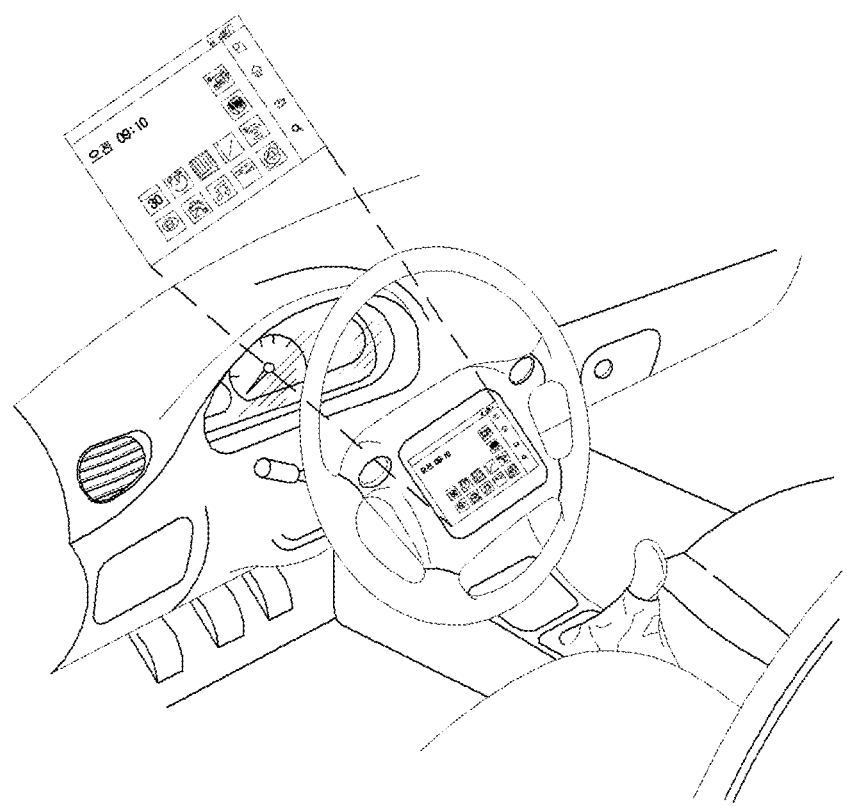
FIG. 9 is a view illustrating a method of using a display device according to an embodiment of the present disclosure.

For yet another example, referring to FIG. 9, when the safety of a moving object is secured and thus a user's special control for autonomous driving is not necessary, the moving object may provide a display not only to a wheel display device but also to a windshield region. For a concrete example, a display may be provided to a windshield region of a moving object, only when an autonomous driving level (or step) of the moving object is so high as to be equal to or above a preset level. Here, for example, a HUD (Head Up Display) embodied in a moving object may be provided as a display in the windshield region of the moving object. However, when a display is embodied in a windshield region, a user's field of view related to the driving of a moving object may be constrained. Accordingly, a windshield display may be provided only when an autonomous driving level is high enough. Meanwhile, for example, a wheel display device of a moving object may receive user input, based on which a windshield display may be controlled.

Figure 10:
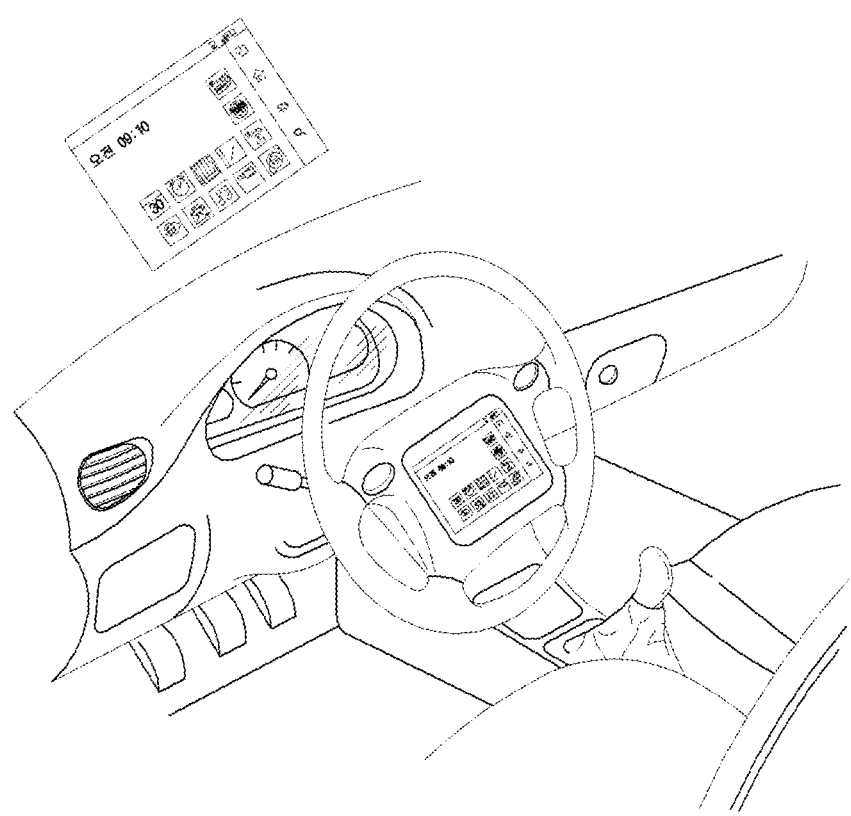
FIG. 10 is a view illustrating a method of using a display device according to an embodiment of the present disclosure.

As a more concrete example, FIG. 10 may be a method where an input unit is displayed in a wheel display device of a moving object and an output unit is displayed in a windshield. For example, as described above, when an autonomous driving level is high and a user need not be involved in the driving of a moving object, the moving object may provide an input unit and an output unit for the user. For example, an input unit may be a keyboard or a touch screen and is not limited to the above-described embodiment. In addition, an output unit may be embodied based on a HUD or hologram, which is not limited to the above-described embodiment. In other words, a user of a moving object may perform actions, which are not irrelevant to driving, inside the moving object operated based on autonomous driving. The moving object may provide UI/UX for such actions.

Figure 11:
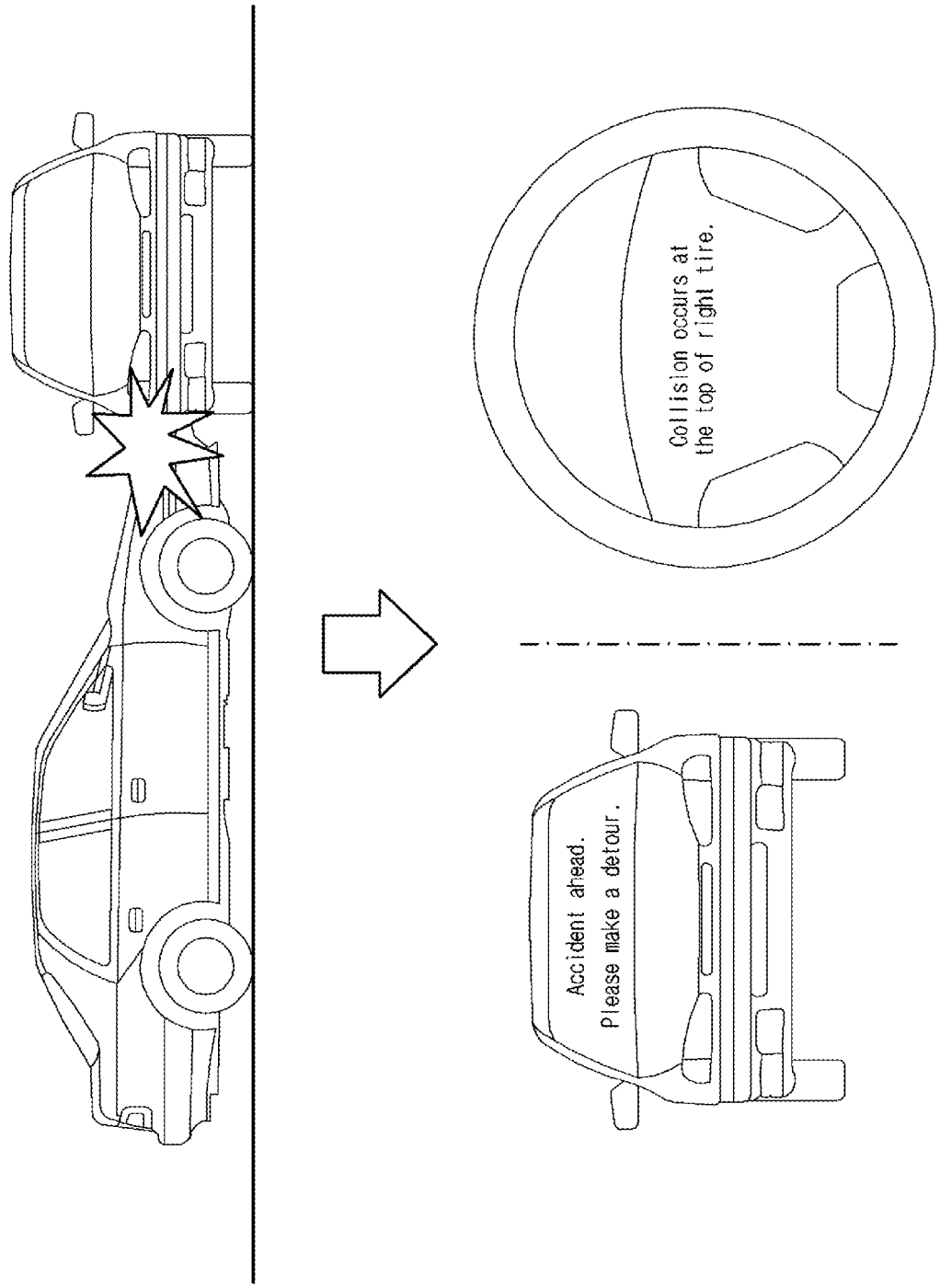
FIG. 11 is a view illustrating a method of displaying information on a wheel display and a windshield display in the case of an accident of a moving object, according to an embodiment of the present disclosure.

FIG. 11 is a view illustrating a method of displaying information on a wheel display and a windshield display in the case of an accident of a moving object. Referring to FIG. 11, a case where a collision or an accident occurs to a moving object may be considered. In this case, for example, as described above, a moving object may judge a possibility of collision and prepare for a collision by activating an airbag. However, for example, when a collision occurs to a moving object, the moving object may provide information related to the collision through its display device. For example, when a collision occurs to a moving object, the moving object may display information related to the accident through a windshield display. Here, for example, before a collision occurs to a moving object, a windshield display of the moving object may be set to provide information to the interior of the moving object. On the other hand, when a collision occurs to a moving object, the setting of a windshield display of the moving object may be changed to provide information outside the moving object. In other words, a windshield display device may be switched. For a concrete example, before an accident occurs to a moving object, a windshield display device inside the moving object may be activated through a HUD inside the moving object. On the other hand, when an accident occurs to a moving object, a HUD inside the moving object may be deactivated. On the other hand, as a HUD or an image displaying apparatus outside a moving object is activated, a display device like windshield may be activated outward from the moving object. For example, a display device may be activated in a windshield outside a moving object. In addition, for example, a display device may be activated at a different location from a windshield outside a moving object. For example, based on an impact caused by an accident, a moving object may exclude an unavailable region of displaying among exterior regions of the moving object. In this case, a moving object may activate a display device in an available region where the display device can be activated. For a more concrete example, when a moving object judges that a display device can be activated on a windshield, the moving object may activate a display device on the windshield. On the other hand, when a moving object judges that a display device cannot be activated on a windshield, the moving object may activate a display device in a different exterior region from the windshield, which is not limited to the above-described embodiment.

In addition, for example, a HUD or an image displaying apparatus outside a moving object may be installed between a windshield and a hood of the moving object. In other words, a windshield display device may be changed according to whether or not a collision occurs to a moving object, which is not limited to the above-described embodiment.

In addition, for example, when a collision occurs to a moving object, information related to the collision may be displayed in a wheel display device. For example, when a collision occurs to a moving object but the collision is not so serious as to deploy an airbag, the moving object may display information on the collision in a wheel display device. For example, a moving object may display information on a collision spot in a wheel display device. For another example, a moving object may further display other information related to accident settlement, which is not limited to the above-described embodiment. Meanwhile, for example, when a collision occurs to a moving object and the accident is so serious as to make an airbag deployed, the moving object may not activate a wheel display device. A moving object may not activate a wheel display device and may send relevant information to a device of the user of the moving object or an external apparatus, which is not limited to the above-described embodiment. In other words, a display device embodied in a moving object may be used in different ways based on the occurrence of a collision, which is not limited to the above-described embodiment.

Figure 12:
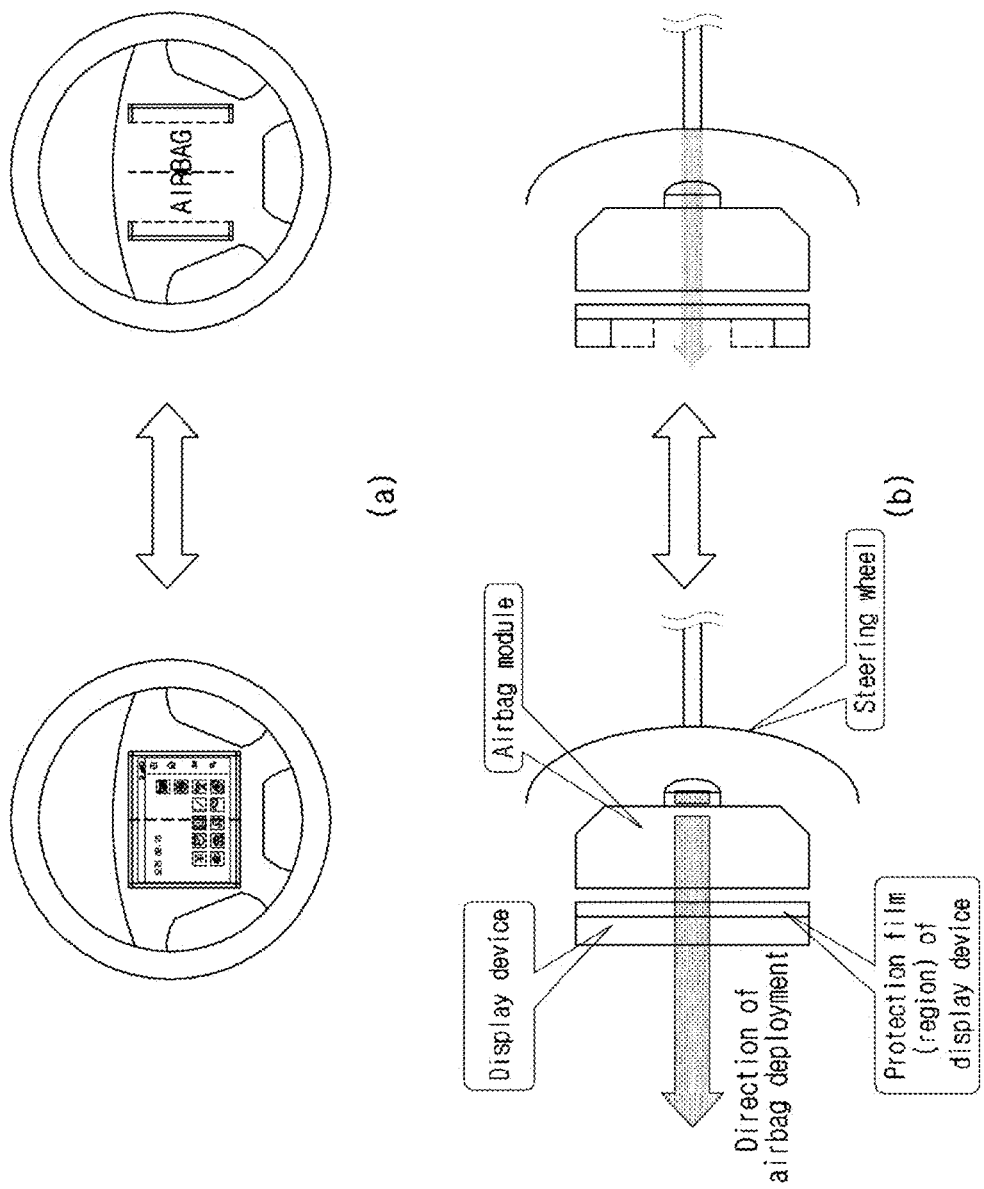
FIG. 12 is a view illustrating a method where a display device is installed by considering an airbag, according to an embodiment of the present disclosure.
Figure 13:
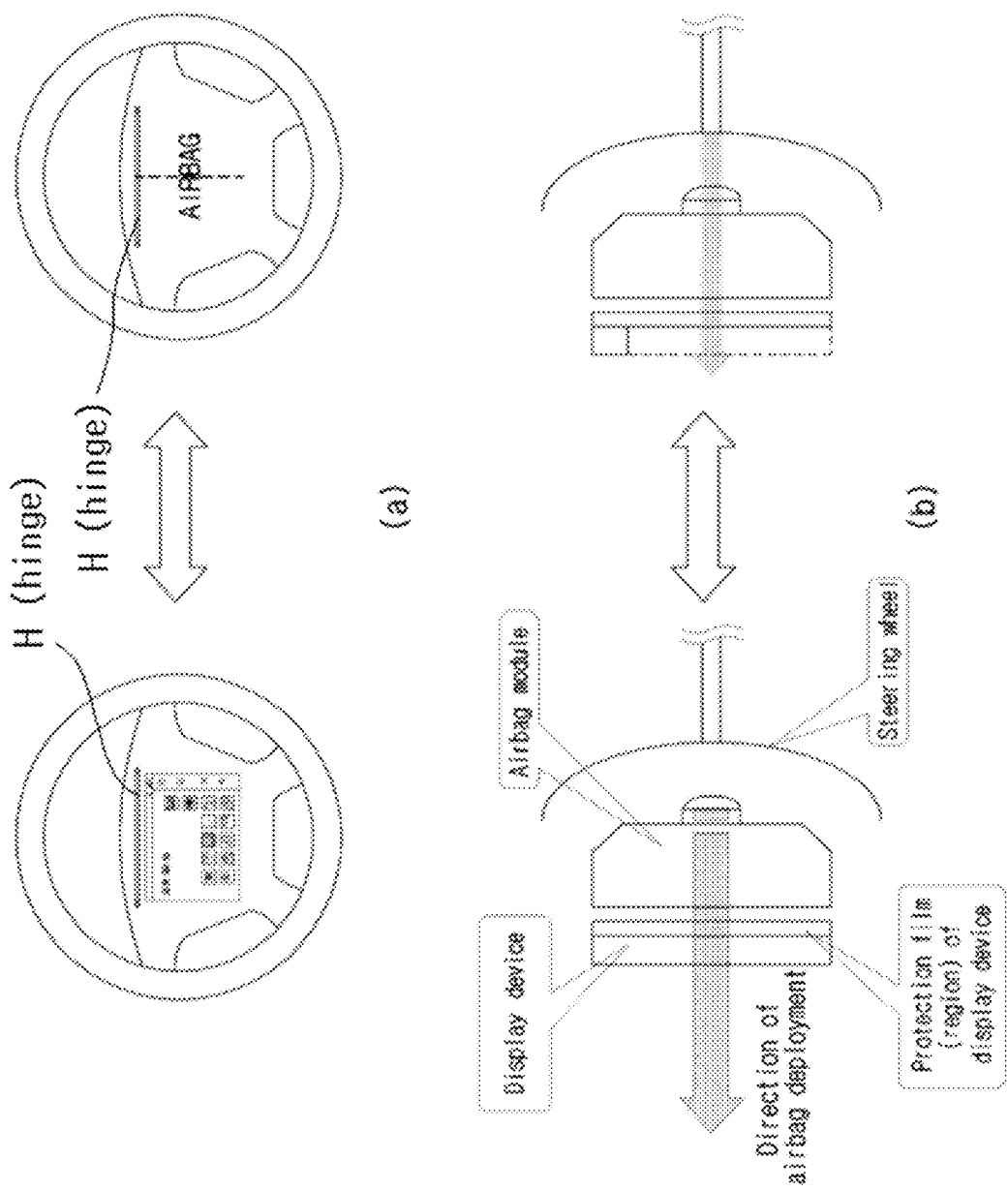
FIG. 13 is a view illustrating a method where a display device is installed by considering an airbag, according to an embodiment of the present disclosure.

FIG. 12 and FIG. 13 are views illustrating a method where a display device is furnished in consideration of an airbag.

For example, referring to (a) in FIG. 12, an airbag may be installed inside a steering wheel. Here, for example, when an impact occurs to a moving object, the front region of a steering wheel may be divided in opposite directions from a vertical reference line and an airbag may be deployed. For another example, an airbag may be deployed by being inflated in opposite directions from a reference line of the front region of a steering wheel. In consideration of the above description, a display device may be divided by a reference line from which an airbag is inflated. In other words, two display devices may adjoin each other with a reference line, from which an airbag is deployed, at the center and thus may constitute a whole display device. Here, for example, as described above, when a display device is activated, an airbag may deactivated and the display device may provide an image or a video. On the other hand, when an airbag is activated and a display device is deactivated, the power supply to the display device may be switched off and a space for two display devices may be provided. Specifically, as described above, a display device may be divided into two display devices. Here, when a display device is activated, a hinge connected to the display device may be adjusted so that two display devices can adjoin each other with no space left therebetween. In other words, two display devices may constitute one display. On the other hand, when an airbag is activated, an additional accident may occur due to a display device while the airbag is deployed. In consideration of the above description, a display device needs to be so designed as not to affect the airbag deployment. Here, for example, as described above, a display device may be adjusted through a hinge so that a space can be furnished for deployment of an airbag. In other words, when an airbag is activated, the power supply to a display device may be switched off and a space for two display devices may be secured. Thus, the airbag deployment may not be hindered. In addition, for example, in consideration of airbag deployment, a display device may be embodied by using a flexible material or a material that cannot be fragmented, which is not limited to the above-described embodiment.

For another example, in consideration of airbag consideration, a display protection region may be located on the back side of a display device in order to prevent the display device from being fragmented. Here, for example, a display protection region may be a display protection film. In addition, for example, a display protection region may be a structure integrated with a display. In addition, for example, a display protection region may mean a protective structure embodied in various forms to protect not only a protection film but also a display device, which is not limited to the above-described embodiment.

Specifically, referring to (b) in FIG. 12, a display protection film may be furnished between a display device and an airbag. A display protection film may have a structure where a protective film part or line opened for protecting a display panel from the deployment of an airbag is made of a softer material than the remaining part. Alternatively, a display protection film may have a combined structure of different parts. Thus, fragments may be prevented in a display device during the deployment of an airbag. Specifically, a display device may be embodied by tempered glass. Here, for example, an airbag may be deployed according to a strong pressure based on a collision. Accordingly, a strong pressure of an airbag may be transferred to a display device. If fragments are generated in the display device, they may threaten a user. In consideration of the above description, a display protection film may be installed between a display device and an airbag. Thus, a fragment may be prevented from being generated in a display device. Meanwhile, for example, when an airbag is activated and a display device may be deactivated, the display device may be divided in opposite directions from a hinge and thus may not hinder the deployment of the airbag, as described above. In this case, a display protection film may also be maintained to prevent a display device from being fragmented, as illustrated in FIG. 12.

For another example, a display protection film may be combined with a display device. In this case, when an airbag is deployed, a display protection film may wrap a display device, which will be described below.

For yet another example, referring to FIG. 13, a display device may be constructed by a flexible display. Here, for example, a flexible display may be furnished based on a hinge H above in a different direction from a reference line where an airbag is deployed, as illustrated in FIG. 13. Here, for example, when a display device is activated, a flexible display may be extended from a hinge H above and thus may be furnished to the front display device of a steering wheel. On the other hand, when an airbag is activated, a flexible display may be reduced to a hinge part above so that an airbag can be deployed without hindrance. In addition, for example, a hinge of a flexible display may be installed in a different part from a reference line where an airbag is deployed. The above description is not exhaustive. In other words, a flexible display may be used for the front display device of a steering wheel. Thus, the flexible display may be operated in connection with an airbag through an autonomous driving mode. However, for example, in the above-described case, a display protection film may also be embodied between an airbag and a flexible display. For example, a display protection film may prevent an impact from being transmitted to a flexible display and a hinge where a flexible display is installed. The above-described embodiment is not exhaustive.

Figure 14:
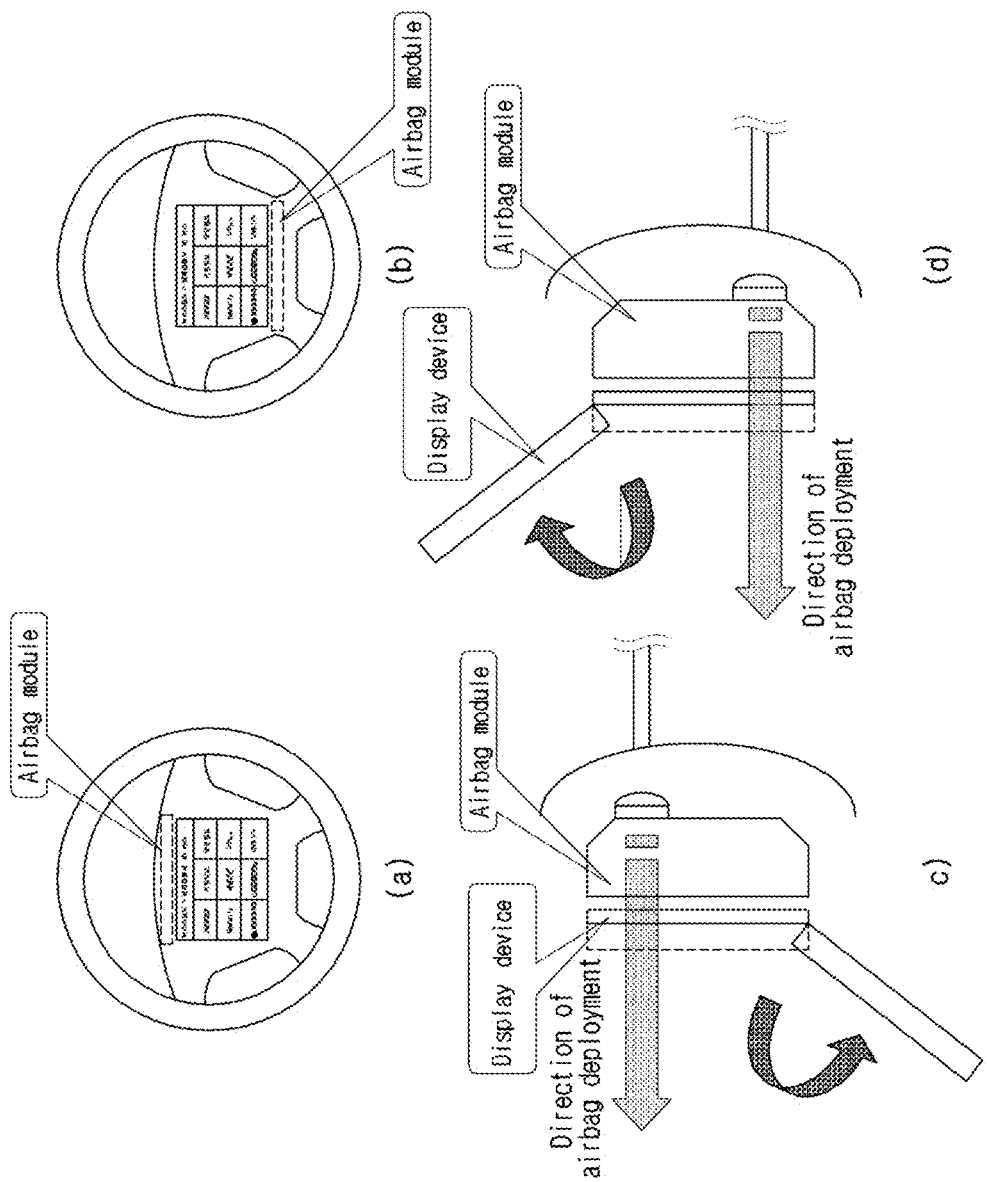
FIG. 14 is a view illustrating a method of determining the location of an airbag by considering a display device, according to an embodiment of the present disclosure.

FIG. 14 is a view illustrating a method of determining the location of an airbag by considering a display device. As described above, when a display device is activated, an airbag may be deactivated. In addition, for example, when an airbag is activated, a display device may be deactivated. In other words, the activation of a display device and the activation of an airbag may be operated in opposite ways to each other. However, in the above-described case, an airbag may not be smoothly deployed because of a display device. For example, when an airbag is deployed in the middle of a display device, as illustrated in FIG. 12, the display device may be fragmented based on a pressure of the airbag. In addition, for example, an airbag may not be smoothly deployed because of a display device. In consideration of the above description, an airbag may be set to be extended from the top of a display device. For example, referring to (a) in FIG. 14, an airbag may be installed above a display device. For another example, referring to (b) in FIG. 14, an airbag may be installed below a display device. In other words, an airbag may not be deployed into a display device, and an airbag may be deployed by avoiding a display device. Thus, an airbag may be smoothly deployed.

For a more concrete example, referring to (c) in FIG. 14, an airbag may be extended from a top region on the basis of (a) in FIG. 14. Here, an entire display device may move downwards due to the deployment of an airbag. In the above-described case, since only the region above a display device is extended downwards under a pressure of an airbag, the airbag deployment may not be hindered. For another example, referring to (d) FIG. 14, an airbag may be extended from a bottom region on the basis of (b) in FIG. 14. Here, an entire display device may move upwards due to the deployment of an airbag. In the above-described case, since only the region below a display device is extended upwards under a pressure of an airbag, the airbag deployment may not be hindered. In other words, an airbag may be installed in a position that is not hindered by a display device. Meanwhile, for example, in FIG. 14, when a display device is activated, an airbag may be deactivated. In addition, a display device may be deactivated, as described above when an airbag is activated.

For another example, an airbag may be installed as illustrated in (a) FIG. 14 or (b) FIG. 14 and then may be deployed, while a display (or display panel) is maintained. For example, as illustrated in (c) FIG. 14 or (d) in FIG. 14, a display may not be extended. For example, as illustrated in (a) FIG. 14, an airbag may be deployed through a space above a wheel display. In addition, for example, as illustrated in (b) FIG. 14, an airbag may be deployed through a space below a wheel display. In other words, even when an airbag is deployed, a display may be maintained. An airbag may be deployed through a certain space in a region where the airbag is installed. Based on the above description, when an airbag is deployed, a display may be prevented from being fragmented, and the airbag may be deployed irrespective of the display.

Figure 15:
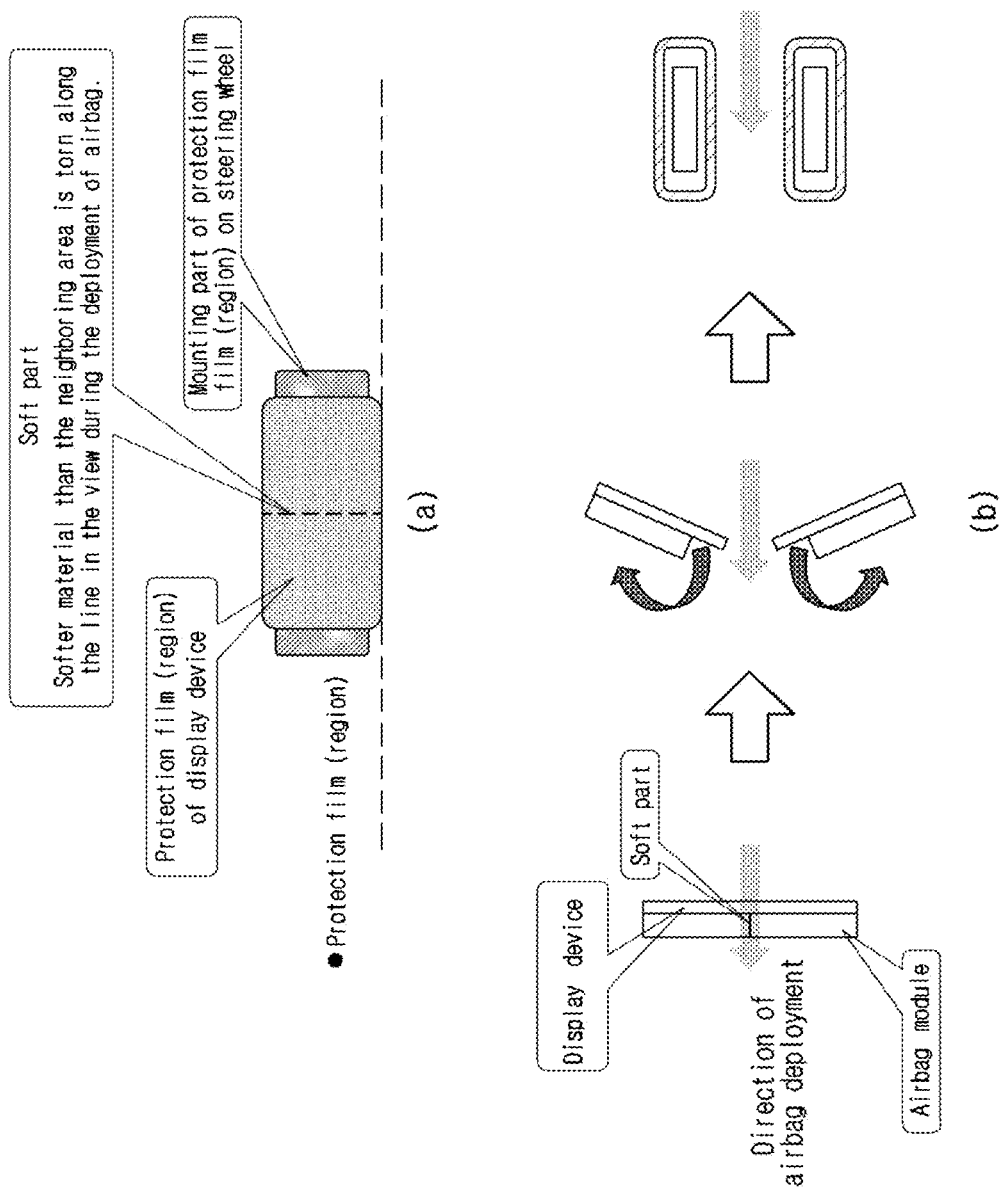
FIG. 15 is a view illustrating a case where a display device is protected based on a display protection region, according to an embodiment of the present disclosure.

FIG. 15 is a view illustrating a case where a display device is protected based on a display protection film.

Referring to (a) in FIG. 15, in consideration of a display device, there may be a display protection film between an airbag and a display device. Here, in a display protection film, a part where an airbag is deployed may have a softer material than the remaining part of the film. For example, when an airbag is deployed, a display protection film may be cut in an airbag deployment direction. Here, a display protection film may absorb a pressure from an airbag. Accordingly, a display device may not be affected by a large pressure. Based on what is described above, even when a display device is embodied on a steering wheel, the deployment of an airbag may not be hindered.

For another example, when a display protection film is cut, each part of the cut display protection film may be deployed by covering a display device. Specifically, referring to (b) in FIG. 15, when an airbag is deployed, a display protection film may be cut in a direction of airbag deployment. Here, for example, when a display protection film is cut, the display protection film may cover a display device. In other words, while an airbag is deployed, a display device may be wrapped by a display protection film at the same time. Here, for example, in a display protection film, a part where an airbag is deployed may have a softer material than the remaining part of the protection film. In addition, in a display protection film, a part where an airbag is deployed may be embodied by a flexible material so that is can be wrapped inwards. For example, when a display device is protected by a display protection film, even if the display device is fragmented by the deployment of an airbag, a driver may be affected. In other words, since fragments exist within a display protection film, the deployment of an airbag may not be hindered.

Figure 16A:
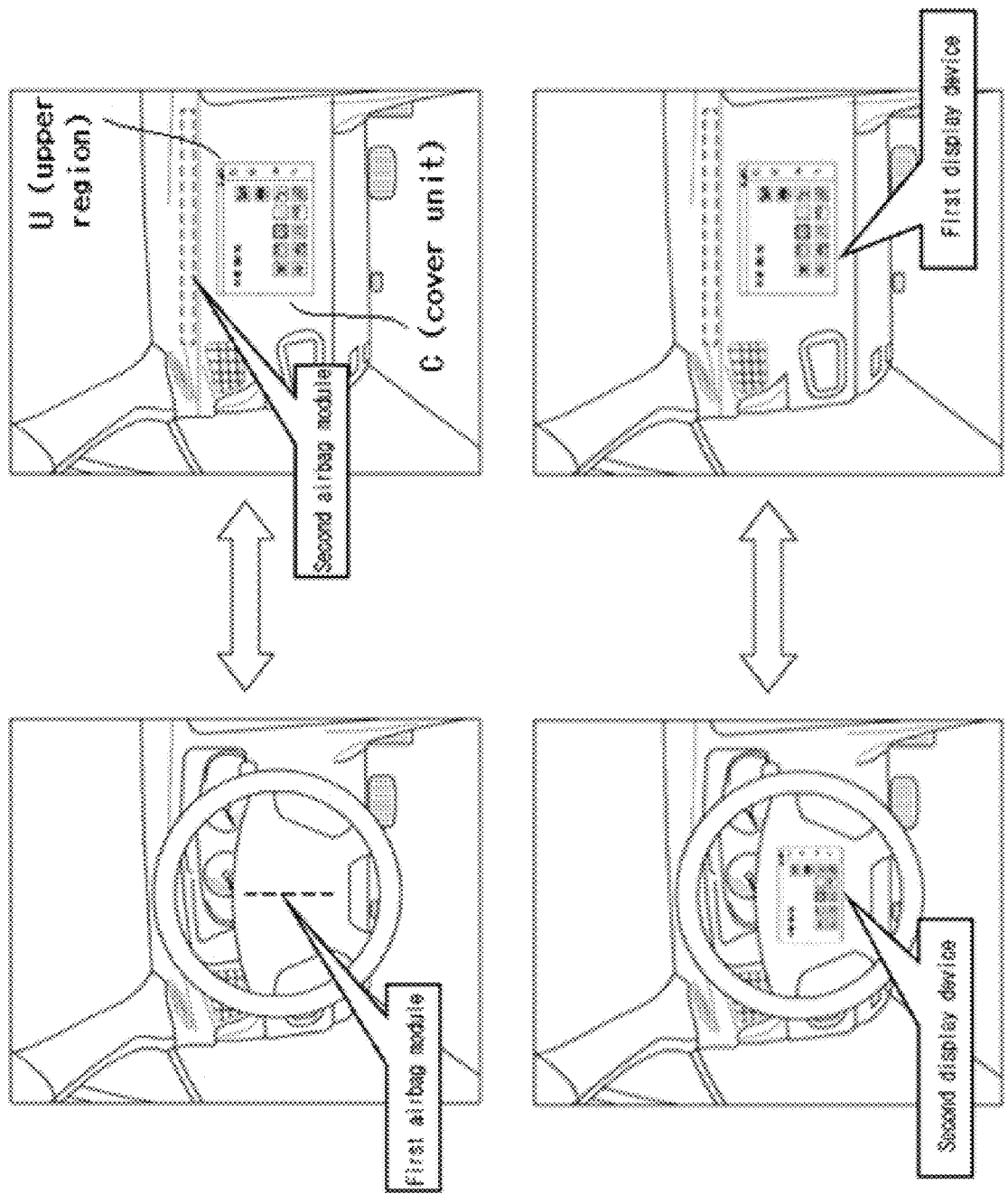
FIG. 16A and FIG. 16B are views illustrating a method where an airbag is activated based on the folding structure of a steering wheel, according to an embodiment of the present disclosure.
Figure 16B:
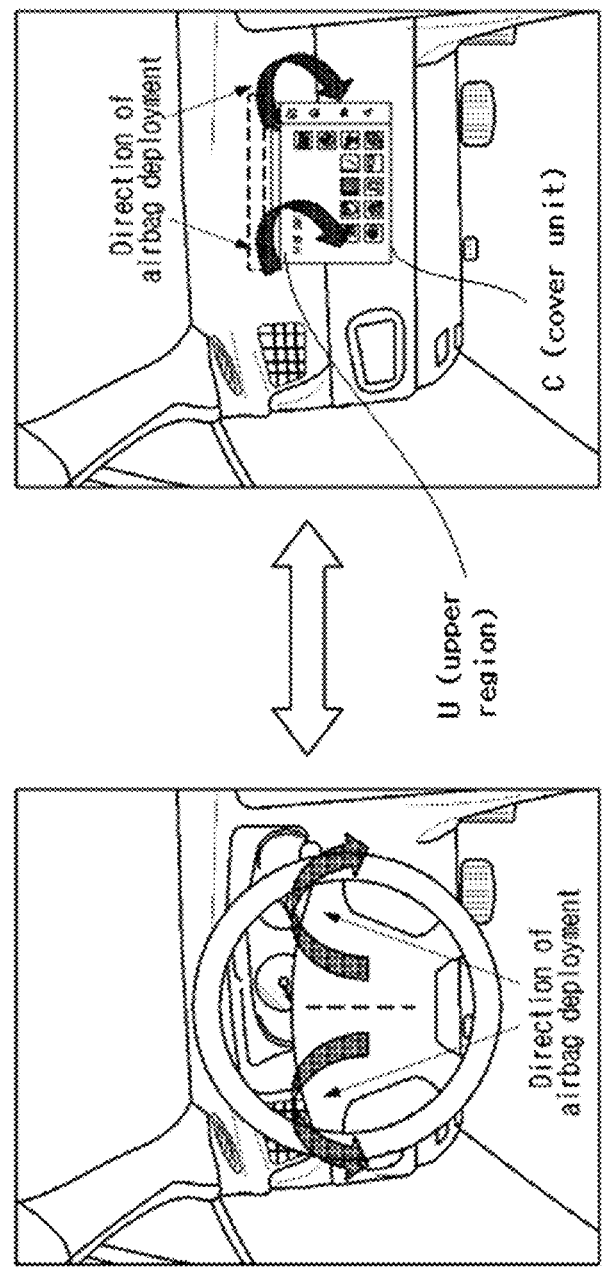

FIGS. 16A and 16B are views illustrating a method where an airbag is activated based on the folding structure of a steering wheel.

Referring to FIGS. 16A and 16B, a moving object may fold a steering wheel. Thus, the steering wheel may be moved inside the moving object. For example, a moving object may fold a steering wheel based on autonomous driving, thereby moving the steering wheel inside it. On the other hand, in a normal driving mode where the control right of a moving object is on a driver side, a steering wheel may be moved outwards as in a conventional moving object. Here, for example, an airbag located in a steering wheel may be operated in the same manner as usual. In other words, when a steering wheel is located inside and a collision occurs to a moving object, an airbag may be deployed from the front face of the steering wheel. For example, in consideration of the above description, a moving object in a normal driving mode may activate a first airbag. Here, a first airbag may be an airbag located in the face of a steering wheel, as described above. For another example, when a steering wheel is folded and moves into a moving object, a display device may be activated. Here, for example, a display device in FIG. 16A or FIG. 16B may be activated in a region where a steering wheel is folded. Meanwhile, for example, when a display device is activated, a second airbag may be activated. As described above, when a display device is activated, an airbag may be deactivated. However, as illustrated in FIG. 16A or FIG. 16B, when a display device is activated based on a structure where a steering wheel is folded, an airbag may not be deactivated in view of the internal structure of a moving object but a second airbag may be activated. For example, a second airbag may be located above or below a display device, as illustrated in FIG. 16A.

For a more concrete example, referring to FIGS. 16A and 16B, when a moving object travels in a normal driving mode and a steering wheel is located outside, a first airbag inside the steering wheel may be activated. In this case, an airbag may be deployed in the same manner as usual. On the other hand, when a moving object travels in an autonomous driving mode and a steering wheel is folded inside, a display device may be activated and a second airbag may be activated. For example, a display device may be furnished in the cover unit C of a steering wheel after the steering wheel is folded, and a second airbag may be located above the display device. Here, for example, the above-described first display device may be a flexible display. For example, when a display device is activated, the display device may be deployed by being extended from a cover unit C. On the other hand, when a display device is deactivated, the display device may be reduced to the upper region U of the cover unit C. Here, for example, when a steering wheel is located in the interior of a moving object after the folding mode is turned off, a flexible display may be located in an inside region of the moving object, that is, in a region invisible from the outside, together with a covering unit. In other words, a display device may be moved to an inside region so that the driver cannot see it. In addition, for example, as described above, when a steering wheel is folded, there may also be a protective region between a display device and an airbag. The detailed operation of the protective region may be the same as described above. For example, when an airbag is deployed, a pressure necessary for the airbag deployment is applied to the top of a display device. Thus, the display device is deployed downwards based on the pressure without hindering the airbag deployment. A different airbag may be activated based on an autonomous driving mode of a moving object. Thus, a display device may be efficiently used in an autonomous driving mode.

For example, in the above-described embodiment, when a steering wheel is located inside a moving object in an autonomous driving mode, a first display device may be activated. Here, a first display device may be activated in a region where a steering wheel is folded. On the other hand, when a moving object is in a normal driving mode and a steering wheel is located outside, a first display device may be deactivated and a second display device may be activated. In this case, the second display device may be located in the cover unit of the steering wheel. In other words, a second display device may be the front display device of an unfolded steering wheel in a moving object.

Figure 17:
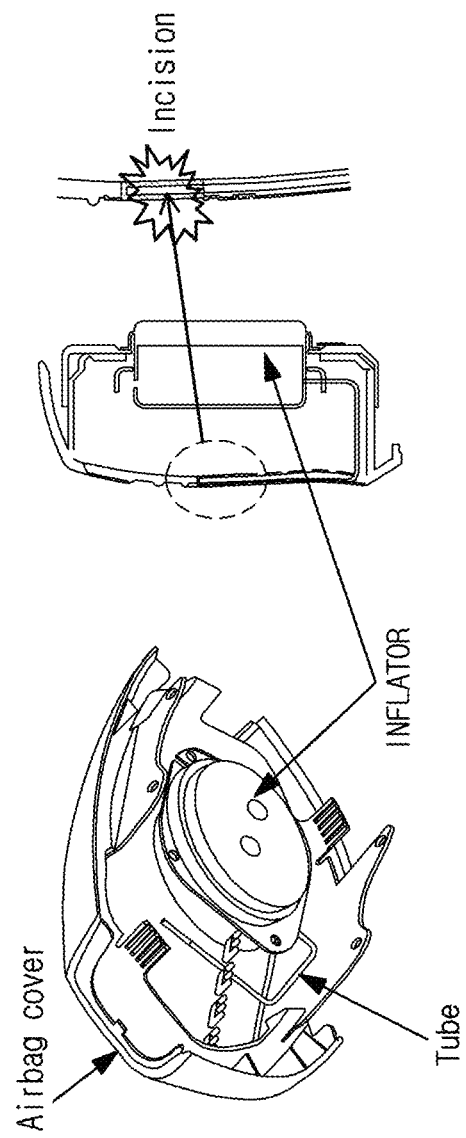
FIG. 17 to FIG. 19 are views illustrating a method of operating an airbag by considering a case where a display is applied.
Figure 18A:
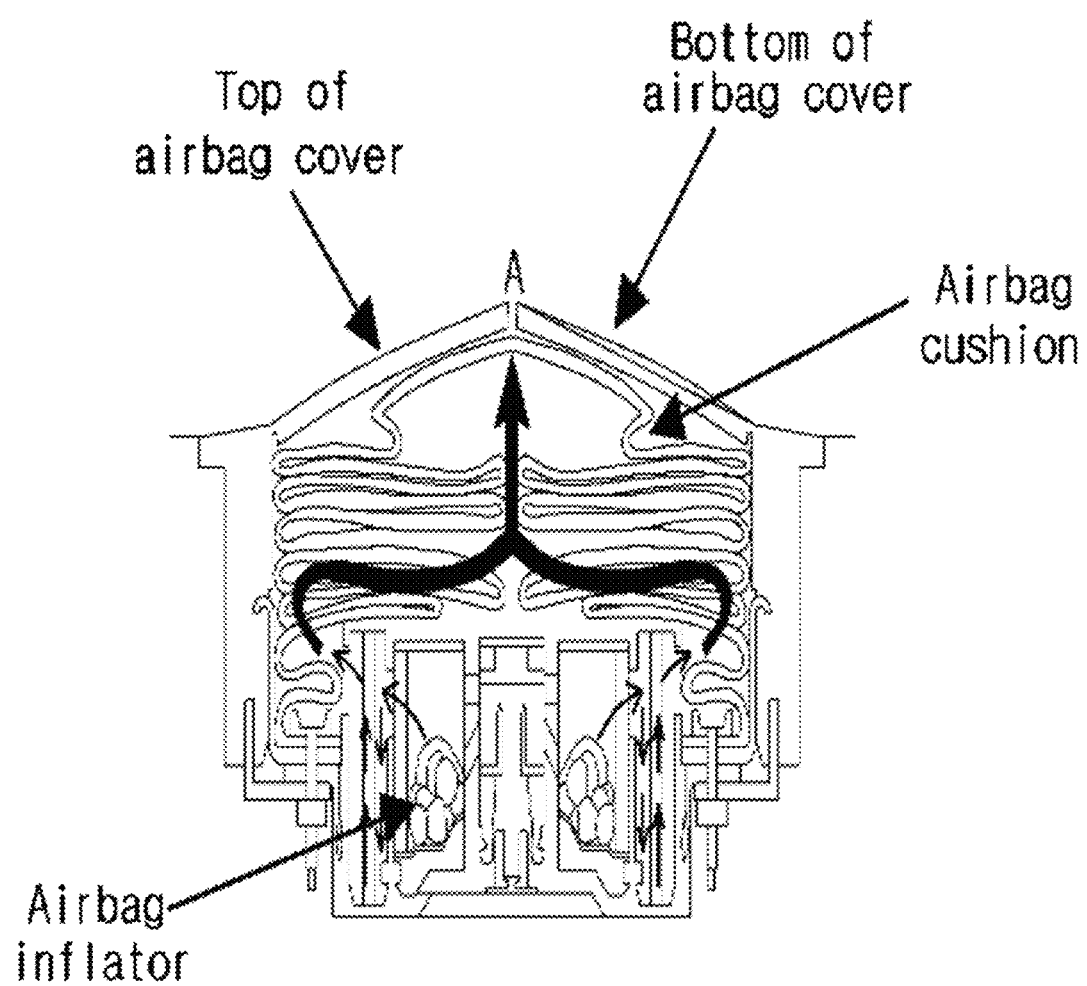
Figure 18B:
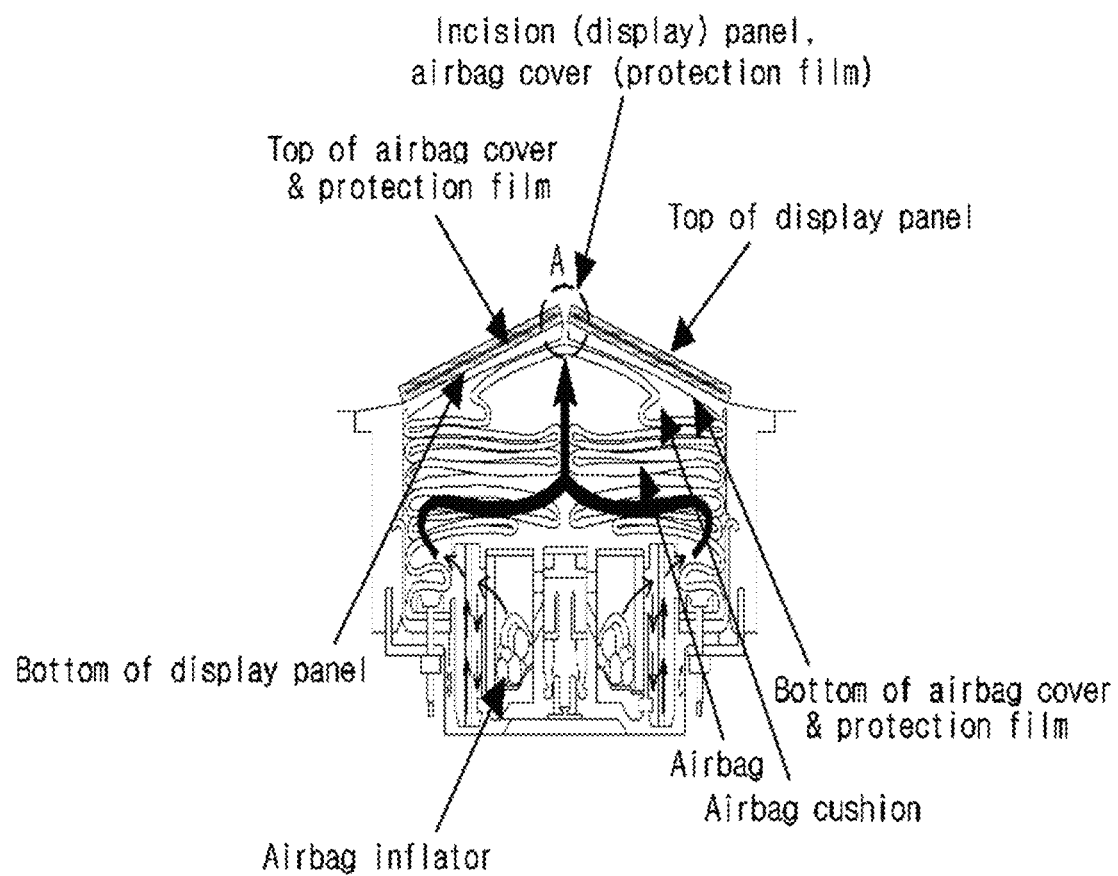
Figure 18C:
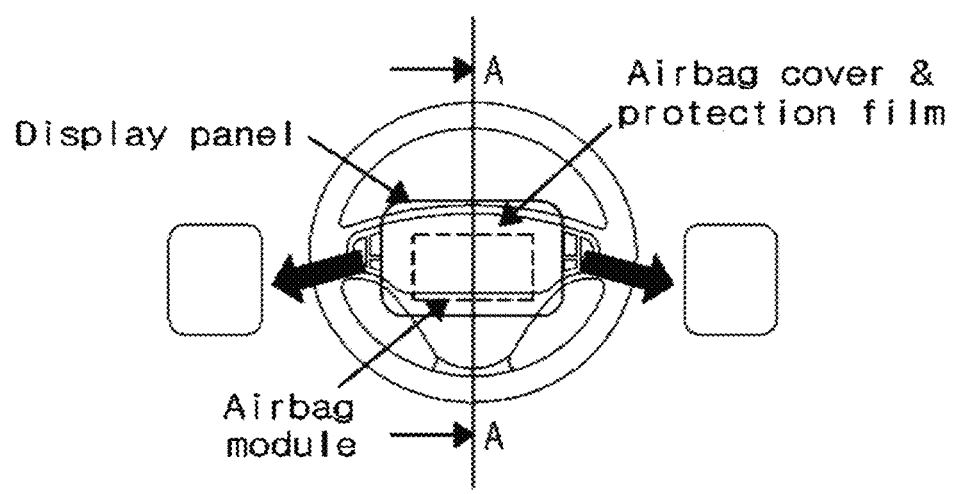
Figure 19:
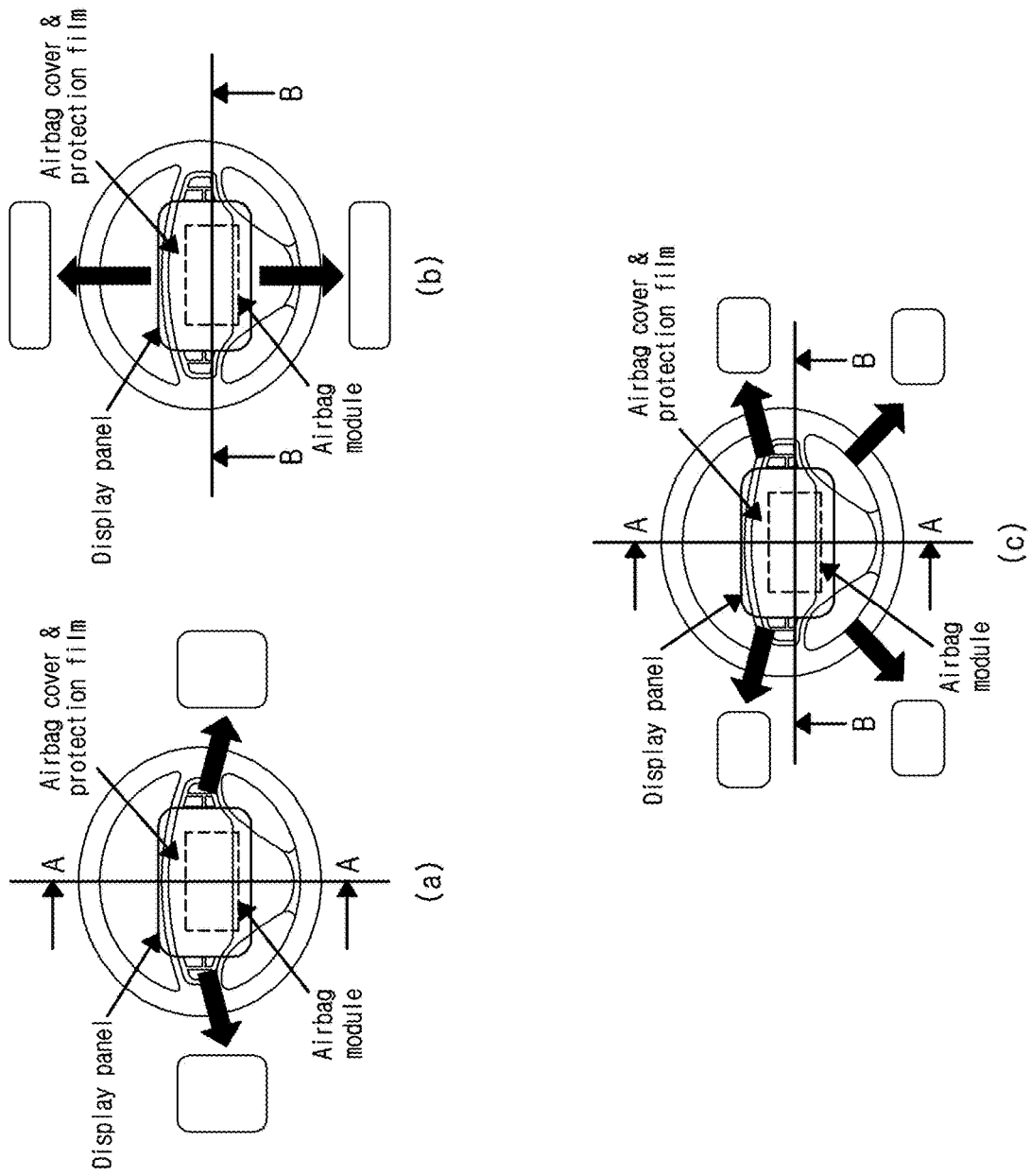

FIG. 17 to FIG. 19 are views illustrating a method of operating an airbag by considering a case where the above-described display is applied. Here, for example, an airbag described in FIG. 17 to FIG. 19 may be applied in FIG. 1 to FIG. 16B. However, FIG. 17 to FIG. 19 present only an example, which may not be limited to examples shown in FIG. 1 to FIG. 16B. In other words, an airbag may operate based on a different method, which is not limited to the above-described embodiment.

Here, for example, referring to FIG. 17, an airbag may operate based on an airbag cover, an airbag body, an airbag control unit (ACU) and an inflator. Herein, an airbag may discharge gas produced by an inflator to the interior of the airbag and a cover hole forming unit. Here, when the internal pressure of a hole formed in a cover increases, the central part of the cover may be cut of itself and thus the pressure may be transmitted to the whole tear seam. Accordingly, the airbag cover itself may not be subjected to any reaction and the pressure may not significantly increase. In other words, an airbag cover may be torn based on an incision, and a pressure on the cover itself may not increase significantly.

For a more concrete example, referring to (a) in FIG. 18, when a moving object senses a sudden stop or a collision during operation, the moving object may deploy an airbag. Particularly, when a moving object senses a head-on collision or a sudden stop, the moving object may deploy an airbag located at the center of a steering wheel. In this case, a moving object may trigger an airbag sensor and an ACU, which are installed in the moving object, to deploy an airbag either in the driver's seat or the front passenger's seat, thereby protecting a passenger. Here, for example, an airbag may be embodied in the structure described in FIG. 17. When a moving object detects the necessity of deploying an airbag, the moving object may transmit an electrical signal to an inflator on the basis of FIG. 17, and the airbag may be inflated by an explosion pressure generated by explosive. For example, as illustrated in (a) in FIG. 18, an airbag cover may be cut into an upper portion of the airbag cover and a lower portion of the airbag cover according to a pressure generated from an inflator, and an airbag cushion may be activated to be deployed.

Here, for example, referring to (b) in FIG. 18, based on the above description, a case where a display is combined with or attached to an airbag cover may be considered. For example, in the above description, a display may be deactivated while an airbag is activated, and a display may be kept activated. Like in (b) in FIG. 18, a display may be combined with an airbag cover and thus the activation of an airbag may not be affected. For example, when an airbag is activated and a display is deactivated, a display device may move to the end of an airbag cover. In other words, a part of a display device, where an airbag cushion is deployed, may disappear. Based on this, an airbag may be activated. However, even in the above-described case, a part of the airbag cover and a part of the display device may be attached to (or combined with) each other. For another example, when an airbag is activated and a display also keeps activated, a display device may be attached to (or combined with) an airbag cover, as illustrated in (b) in FIG. 18.

Here, for example, in all the above-described cases, an airbag cover may have a structure that is not subjected to a large pressure as in FIG. 17, and a display device attached to (or combined with) the airbag cover may also not be subjected to a large pressure. Thus, even when a display device is furnished to a steering wheel region, the deployment of an airbag may not be affected. Hence, the steering wheel display device may be utilized. For a more concrete example, referring to (b) in FIG. 18, the top of an airbag cover and protection film may be attached to (or combined with) the bottom of a display panel. Here, when a pressure is transmitted based on an airbag inflator, an airbag cover may be divided based on an incision and an airbag cushion may be deployed. Here, since a display device, a protection film and an airbag cover may be attached to (or combined with) each other to form an integrated structure, they may be cut together during the deployment of airbag. Here, for example, a display device may be a display panel, and the display panel may be made of a different material from an airbag cover or a protection film. In view of the above description, a display panel may consist of separate panels so that it can be divided by an incision. In other words, a display panel may consist of a first display panel and a second display panel according to an incision. In addition, for example, when a display panel is a flexible panel, the flexible display may be cut (or torn) with an airbag cover.

However, for example, as described above, when an airbag cover (or protection film) is separated from a display device, the safety of a passenger may be threatened. Accordingly, an airbag cover and a display device may constitute a structure where they cannot be separated from each other. Thus, a display device may not hinder the deployment of an airbag and a steering wheel display device may be utilized.

Meanwhile, for another example, a part of an airbag cover and a part of a display device may be separable. For example, when a display device is deactivated based on what is described above, the display device may move to the end of an airbag cover. Here, for the above-described structure, a display device and an airbag cover may not constitute an integrated structure where they are attached to (or combined with) each other in their entirety. Here, for example, a part (end portion) of a display device and a part of an airbag cover may constitute a structure where they are attached to (or combined with) each other and cannot be separated from each other. Based on this, an airbag may be deployed based on the inactivation of a display.

FIG. 19 is a view illustrating a method where an airbag cover and a display device are cut when an airbag is deployed based on the above description.

As described above, an airbag cover may be attached to a display device to form an integrated structure. Here, based on FIG. 17, an airbag cover may not be subjected to a large pressure. Thus, a display device may also not be subjected to a large pressure. For example, referring to (a) in FIG. 19, an airbag cover and a display device may be cut based on the line A-A. In other words, an incision may be formed based on the line A-A, and each of the airbag cover and the display device may be divided based on an incision. Thus, an airbag may be deployed. For another example, referring to (b) in FIG. 19, an airbag cover and a display device may be cut based on the line B-B. In other words, an incision may be formed based on the line B-B, and each of the airbag cover and the display device may be divided based on an incision. Thus, an airbag may be deployed. For yet another example, referring to (c) in FIG. 19, an airbag cover and a display device may be cut based on the lines A-A and B-B. In other words, an incision may be constructed for division in multiple directions. Here, for example, an airbag cover and a display device are cut based on two reference lines in (c) in FIG. 19 but may be cut based on more reference lines, which is not limited to the above-described embodiment. In other words, in (c) in FIG. 19, four airbag covers and display devices may be divided and separated. Thus, an airbag may be deployed.

Figure 20:
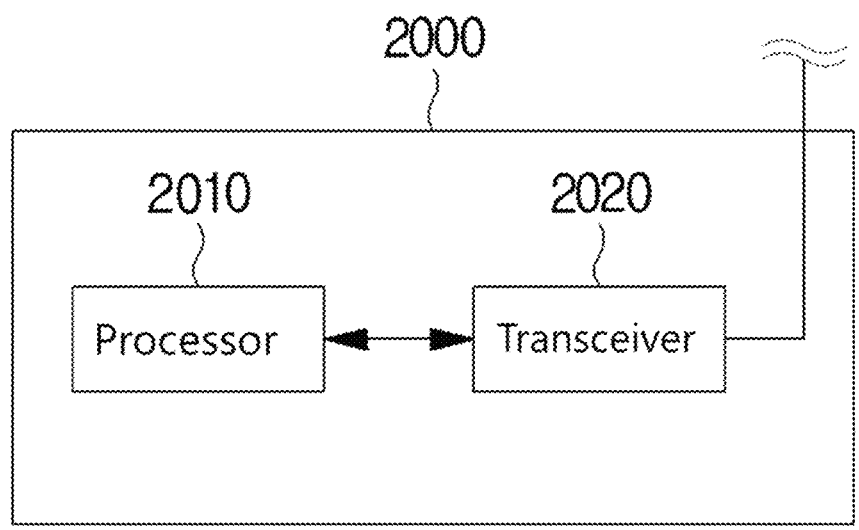
FIG. 20 is a view illustrating an apparatus configuration according to an embodiment of the present disclosure.

FIG. 20 is a view illustrating an apparatus configuration. Referring to FIG. 20, an apparatus may include at least one or more among the above-described moving object, a device, a server and an RSU. In other words, an apparatus may communicate and work with another device, which is not limited to the above-described embodiment. For example, for the above-described operation, an apparatus 2000 may include a processor 2010 and a transceiver 2020. In other words, an apparatus may include a necessary configuration for communicating with another apparatus. In addition, for example, an apparatus may include another configuration apart from the above-described configuration. In other words, an apparatus may have a configuration, which includes the above-described apparatus for communicating with another device but is not limited thereto, and may be operated based on what is described above.

According to the present disclosure, a method and apparatus for using the front display device of a steering wheel in a moving object may be provided.

According to the present disclosure, a controlling method and apparatus may be provided by considering the relationship between a front display device of a steering wheel and an airbag in a moving object.

According to the present disclosure, a method and apparatus for controlling a display device based on an autonomous moving object may be provided.

The technical objects of the present disclosure are not limited to the above-mentioned technical objects, and other technical objects that are not mentioned will be clearly understood by those skilled in the art through the following descriptions.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays, a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. The one or more application specific integrated circuits (ASICs), the digital signal processor (DSP), the digital signal processing device (DSPD), the programmable logic device (PLD), the field programmable gate array, the processor, the controller, the microcontroller, or the microprocessor may be configured to execute the software or machine-executable instructions to perform the above-described operations so as to control the display device, the airbag module, and/or other elements.

What is claimed is:

1. A method of activating a display device in a moving object, the method comprising:
   determining a driving mode of the moving object;
   determining whether or not to activate the display device based on the driving mode of the moving object; and
   displaying a content in the display device in determining that the display device is activated,
   wherein determining whether or not to activate the display device comprises:
      activating the display device in a first driving mode, and
      deactivating the display device in a second driving mode,
   wherein the moving object predicts a collision possibility of the moving object in the first driving mode, and the moving object keeps an activating state of the display device, when the moving object predicts avoiding a collision based on the collision possibility,
   wherein information on the collision possibility and a possibility of avoiding the collision is continually updated through machine learning,
   wherein the display device is comprised in front of a steering wheel of the moving object and comprises a flexible display with a rollable type,
   wherein the flexible display is rotated in one direction on a hinge located at a predetermined part of the steering wheel and is extended to the front of the steering wheel when the display device is activated, and
   wherein the flexible display is rotated in another direction on the hinge to reduce the size of the flexible display when the display device is deactivated.

2. The method of claim 1,
   wherein determining whether or not to activate the display device comprises:
      deactivating an airbag module in the first driving mode, and
      activating the airbag module in the second driving mode.

3. The method of claim 1,
   wherein the display device comprises at least two display devices,
   wherein the at least two display devices are connected and display an image when the display device is activated, and
   wherein the two display devices are separated when an airbag module is deployed.

4. The method of claim 1, wherein an airbag module is located above or below the display device.

5. The method of claim 2,
   wherein, when the display device is activated based on the first mode, the airbag module of the moving object is folded into the moving object, and the display device is installed based on a position of the airbag module.

6. The method of claim 1,
   wherein the first driving mode is an autonomous driving mode and the second driving mode is a normal driving mode,
   wherein a control right of the moving object is provided to the moving object in the first driving mode, and
   wherein the control right of the moving object is provided to a driver of the moving object in the second driving mode.

7. The method of claim 6,
   wherein the first driving mode is an autonomous driving mode exceeding or the same as a preset level, and the second driving mode is at least any one of a normal driving mode or a lower level of autonomous driving mode lower than the preset level.

8. The method of claim 1, further comprises controlling a driving of the moving object based on the driving mode.

9. The method of claim 1,
   wherein the moving object changes an activating state of the display device to a deactivating state of the display device and changes a deactivating state of an airbag module to an activating state of the airbag module, when the moving object predicts not avoiding a collision based on the collision possibility.

10. A method of activating a display device in a moving object, the method comprising:
    determining a driving mode of the moving object;
    determining whether or not to activate the display device based on the driving mode of the moving object; and
    displaying a content in the display device when the display device is activated,
    wherein determining whether or not to activate the display device comprises:
       activating the display device and an airbag module in a first driving mode, and
       activating the airbag module in a second driving mode,
    wherein the moving object predicts a collision possibility of the moving object in the first driving mode, and the moving object keeps an activating state of the display device, when the moving object predicts avoiding a collision based on the collision possibility,
    wherein information on the collision possibility and a possibility of avoiding the collision is continually updated through machine learning,
    wherein the display device is comprised in front of a steering wheel of the moving object and comprises a flexible display with a rollable type,
    wherein the flexible display is rotated in one direction on a hinge located at a predetermined part of steering wheel and is extended to the front of the steering wheel when the display device is activated, and
    wherein the flexible display is rotated in another direction on the hinge to reduce the size of the flexible display when the display device is deactivated.

11. A method of activating a display device in a moving object, the method comprising:
    determining a driving mode in the moving object;
    determining the display device and an airbag, which are activated based on the driving mode of the moving object; and
    displaying a content in the activated display device,
    wherein determining whether or not to activate the display device comprises:
       folding an airbag module into the moving object and activating a first display device in a first driving mode, and
       keeping a position of a steering wheel of the moving object and deactivating the first display device in a second driving mode,
    wherein the moving object predicts a collision possibility of the moving object in the first driving mode, and the moving object keeps an activating state of the first display device, when the moving object predicts avoiding a collision based on the collision possibility, wherein information on the collision possibility and a possibility of avoiding the collision is continually updated through machine learning, wherein the first display device is comprised corresponding to a part in which the steering wheel is folded, the first display device is a flexible display with a rollable type and is located in a cover unit covering the folded steering wheel, wherein the flexible display is rotated in one direction on an upper region of the cover unit and is extended in the cover unit when the first display device is activated, and, wherein the flexible display is rotated in another direction on the upper region to reduce the size of the flexible display when the first display device is deactivated.

12. The method of claim 11, wherein determining whether or not to activate the display device comprises:

activating a second airbag module in the first driving mode, and activating a first airbag module in the second driving mode.

13. The method of claim 12, wherein determining whether or not to activate the display device comprises:

deactivating the first airbag module in the first driving mode, and deactivating the second airbag module in the second driving mode.

14. The method of claim 13, wherein a second display device is activated in the second driving mode.

15. The method of claim 12, wherein the first airbag module is located above or below the first display device.

16. The method of claim 14, wherein the second display device is comprised in front of the steering wheel that is not folded in the moving object.

* * * * *